(12) United States Patent
Takahashi

(10) Patent No.: US 11,936,068 B2
(45) Date of Patent: Mar. 19, 2024

(54) BATTERY, BATTERY PACK, ELECTRONIC DEVICE, ELECTROMOTIVE VEHICLE, POWER STORAGE DEVICE, AND ELECTRIC POWER SYSTEM

(71) Applicant: MURATA MANUFACTURING CO., LTD., Kyoto (JP)

(72) Inventor: Hidetoshi Takahashi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 291 days.

(21) Appl. No.: 16/236,829

(22) Filed: Dec. 31, 2018

(65) Prior Publication Data
US 2019/0140241 A1 May 9, 2019

Related U.S. Application Data

(63) Continuation of application No. PCT/JP2017/017283, filed on May 2, 2017.

(30) Foreign Application Priority Data
Jul. 8, 2016 (JP) .................................. 2016-135666

(51) Int. Cl.
*H01M 50/46* (2021.01)
*B60K 6/28* (2007.10)
(Continued)

(52) U.S. Cl.
CPC ............... *H01M 50/46* (2021.01); *B60K 6/28* (2013.01); *B60L 50/64* (2019.02); *B60L 58/10* (2019.02);
(Continued)

(58) Field of Classification Search
CPC ............ H01M 10/0587; H01M 10/04; H01M 10/0431; H01M 10/425; H01M 10/44;
(Continued)

(56) References Cited

U.S. PATENT DOCUMENTS 6,797,429 B1 9/2004 Komatsu
2005/0221173 A1 10/2005 Tatebayashi et al.
(Continued)

FOREIGN PATENT DOCUMENTS

EP 2 276 091 1/2011
JP H1074538 A 3/1998
(Continued)

OTHER PUBLICATIONS

English Translation of JP2005222884.*
(Continued)

*Primary Examiner* — Kiran Quraishi Akhtar
(74) *Attorney, Agent, or Firm* — K&L Gates LLP

(57) ABSTRACT

A battery is provided. The battery includes a wound electrode body including a positive electrode, a negative electrode, and a separator interposed therebetween. In an inner circumferential part of the wound electrode body, an insulator is configured to cover at least a partial surface of the separator or a negative electrode collector surface surrounding a first space. The positive electrode or a positive electrode collector is absent in the first space surrounded by the negative electrode collector.

16 Claims, 15 Drawing Sheets

(51) Int. Cl.
| | |
|---|---|
| *B60L 50/64* | (2019.01) |
| *B60L 53/51* | (2019.01) |
| *B60L 53/53* | (2019.01) |
| *B60L 58/10* | (2019.01) |
| *H01M 4/02* | (2006.01) |
| *H01M 10/04* | (2006.01) |
| *H01M 10/0587* | (2010.01) |
| *H01M 10/42* | (2006.01) |
| *H01M 10/44* | (2006.01) |
| *H01M 50/119* | (2021.01) |
| *H01M 50/121* | (2021.01) |
| *H01M 50/129* | (2021.01) |
| *H01M 50/586* | (2021.01) |
| *H01M 50/595* | (2021.01) |

(52) U.S. Cl.
CPC ......... *H01M 4/02* (2013.01); *H01M 10/0431* (2013.01); *H01M 10/0587* (2013.01); *H01M 10/425* (2013.01); *H01M 10/44* (2013.01); *H01M 50/586* (2021.01); *H01M 50/595* (2021.01); *B60L 53/51* (2019.02); *B60L 53/53* (2019.02); *B60L 2210/40* (2013.01); *B60Y 2200/91* (2013.01); *B60Y 2200/92* (2013.01); *B60Y 2300/91* (2013.01); *B60Y 2400/112* (2013.01); *H01M 2010/4271* (2013.01); *H01M 50/119* (2021.01); *H01M 50/121* (2021.01); *H01M 50/129* (2021.01)

(58) Field of Classification Search
CPC ........ H01M 4/02; H01M 2/1673; H01M 2/16; H01M 2/14; H01M 2/0277; H01M 2/34; H01M 2/1016; H01M 2200/00; H01M 2010/4271; H01M 50/46; H01M 50/116; H01M 50/40; H01M 50/409; H01M 50/572; H01M 50/474; H01M 50/531; H01M 50/586; H01M 50/119; H01M 50/121; H01M 50/129; H01M 50/595; Y02T 10/70; Y02E 60/10; B60Y 2400/112; B60Y 2300/91; B60Y 2200/91; B60Y 2200/92; B60L 2210/40; B60L 58/10

See application file for complete search history.

(56) References Cited

U.S. PATENT DOCUMENTS

| | | | |
|---|---|---|---|
| 2012/0107573 A1* | 5/2012 | Iwata | C09J 7/381 |
| | | | 428/189 |
| 2012/0189888 A1 | 7/2012 | Yue | |
| 2012/0214061 A1* | 8/2012 | Machida | H01M 4/523 |
| | | | 429/211 |
| 2013/0034750 A1 | 2/2013 | Choi et al. | |
| 2014/0141303 A1* | 5/2014 | Matsushita | H01M 4/133 |
| | | | 429/94 |
| 2014/0295263 A1* | 10/2014 | Iwama | H01M 50/46 |
| | | | 429/211 |

FOREIGN PATENT DOCUMENTS

| | | | | |
|---|---|---|---|---|
| JP | H1126008 A | | 1/1999 | |
| JP | H11176478 A | | 7/1999 | |
| JP | 20000285902 A | | 10/2000 | |
| JP | 2005222884 | * | 8/2005 | ............ H01M 10/04 |
| JP | 2005222884 A | | 8/2005 | |
| JP | 2008047398 A | | 2/2008 | |
| JP | 2013038064 A | | 2/2013 | |
| JP | 2014191912 A | | 10/2014 | |
| JP | 2015035250 A | | 2/2015 | |

OTHER PUBLICATIONS

International Search Report for Application No. PCT/JP2017/017283, dated Jul. 11, 2017.
Extended European Search Report dated Jan. 30, 2020 in corresponding European Application No. 17823856.4.
Chinese Office Action dated Jan. 19, 2021 in corresponding Chinese Application No. 201780040669.5.
Search Report dated Jan. 19, 2021 in corresponding Chinese Application No. 201780040669.5.
Chinese Office Action dated Jun. 23, 2021 in corresponding Chinese Application No. 201780040669.5.

* cited by examiner

EXAMPLE 9

BATTERY, BATTERY PACK, ELECTRONIC DEVICE, ELECTROMOTIVE VEHICLE, POWER STORAGE DEVICE, AND ELECTRIC POWER SYSTEM

CROSS REFERENCE TO RELATED APPLICATIONS

The present application is a continuation of PCT patent application no. PCT/JP2017/017283, filed on May 2, 2017, which claims priority to Japanese patent application no. JP2016-135666 filed on Jul. 8, 2016, the entire contents of which are being incorporated herein by reference.

BACKGROUND

The present technology generally relates to a battery prepared by winding an electrode coated with an electrode mixture and accommodating the wound electrode body in a laminate outer packing, a battery pack, an electronic device, an electromotive vehicle, a power storage device, and an electric power system.

By decreasing the proportion of the members that are not involved in charging and discharging in the battery pack, it is possible to improve the energy density of the battery. However, since reduction in thicknesses of a foil and a separator deteriorates the nailing safety, it is necessary to keep the thicknesses of these members to a certain thickness or larger so as to ensure the safety of the battery.

Heretofore, there has been proposed a structure (hereinafter, referred to as "foil winding structure") in which a positive electrode collector and a negative electrode collector lacking an active material-containing coat are provided in the outermost circumference of a battery having a wound structure with a separator interposed therebetween.

SUMMARY

The present technology generally relates to a battery prepared by winding an electrode coated with an electrode mixture and accommodating the wound electrode body in a laminate outer packing, a battery pack, an electronic device, an electromotive vehicle, a power storage device, and an electric power system.

One known test example for evaluating the internal short circuit condition is a nailing test. In the nailing test, an iron nail is knocked into a battery to penetrate the battery to cause an internal short circuit. Since a short circuit occurs via the nail, an internal short circuit occurs without limited to the exposed part of the collector. In the case of the nailing test, heat generation in short circuit sites of the nail and the positive electrode is large. Since the heat generation in short circuit sites of the nail and the positive electrode increases in proportion to the square of the current passing through the nail, it is important to suppress the current passing through the nail.

For example, a negative electrode collector is formed of a copper foil, and a positive electrode collector is formed of an aluminum foil. When these collectors are short-circuited with a nail, the current flows via the nail. Since the exposed part of the copper foil contacts the nail with low resistance, the present art reduces the current passing through the nail by covering the negative electrode collector with a covering material.

According to the present disclosure, heat generation in the short circuit sites of the nail and the positive electrode decreases, so that the safety is improved. Since the covering material is rolled in when the nail is knocked in as long as the covering material exists above the negative electrode collector, the covering material is not necessarily adhered to the negative electrode collector, and may exist on the separator. However, a covering material having a low melting point will melt by the heat generated near the nail, and reduce the effect.

Further, while the site of heat generation at the time of internal short circuit differs depending on the place in the battery, basically, an outer side of the battery is in contact with air and is likely to diffuse heat, and the temperature is more likely to rise in a place closer to the center of the battery. Therefore, it is expected that the safety is further improved by suppressing heat generation on the inner circumferential side where a high current flows even in a low resistance short circuit.

The present disclosure provides a battery, a battery pack, an electronic device, an electromotive vehicle, a power storage device, and an electric power system capable of improving the safety against the nailing test compared with a conventional foil winding structure.

According to an embodiment of the present disclosure, a battery is provided. The battery having a wound electrode body including a positive electrode and a negative electrode, and a separator interposed therebetween, wherein in an inner circumferential part of the wound electrode body, an insulator is configured to cover at least a partial surface of the separator or a negative electrode collector surface surrounding a first space, and wherein the positive electrode or a positive electrode collector is absent in the first space surrounded by the negative electrode collector.

According to another embodiment of the present disclosure, the battery pack, electronic device, electromotive vehicle, power storage device, and electric power system of the present art have the battery as described herein.

According to at least on embodiment, by providing an insulator, it is possible to prevent the negative electrode collector and the nail of the nailing test from coming into contact with each other with low resistance, so that it is possible to reduce the current flowing in the nail, and to reduce the heat generation. Further, since the heat generation in the center part of the battery is suppressed, it is possible to suppress the thermal runaway at the time of occurrence of an internal short circuit even in a battery having a thinned foil or a thinned separator, for example. The effects described herein are not limitative, and other suitable properties relating to the present technology may be realized and as further described.

DETAILED DESCRIPTION

As described herein, the present disclosure will be described based on examples with reference to the drawings, but the present disclosure is not to be considered limited to the examples, and various numerical values and materials in the examples are considered by way of example.

One exemplary battery of the laminate film type to which the present art is applicable is described below (see, Japanese Patent Application Laid-Open No. 2001-266946, for example).

Figure 1:
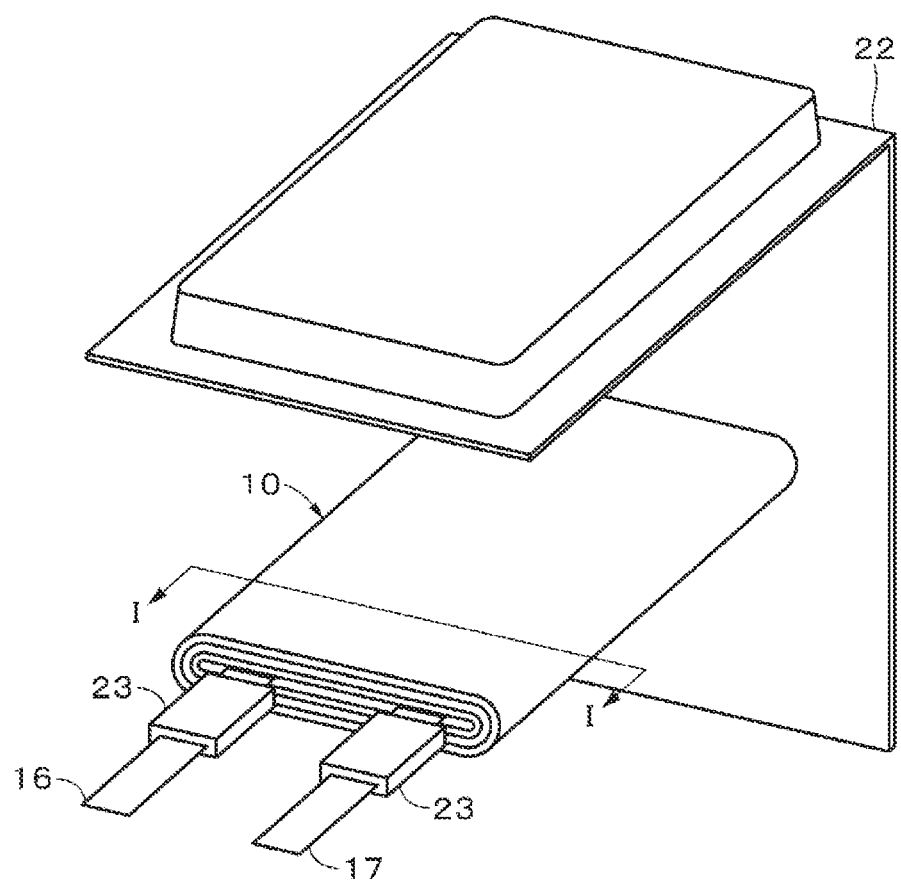
FIG. 1 is a perspective view for illustrating a battery according to an embodiment of the present technology.

The present art relates to a battery prepared by winding a positive electrode and a negative electrode that are serially coated with an electrode active material layer, and accommodating the resultant wound body in an outer package member. FIG. 1 illustrates a configuration of a non-aqueous electrolytic battery 21. The non-aqueous electrolytic battery 21 is prepared by accommodating a wound electrode body 10 inside an outer package member 22 in the form of a film, together with an electrolyte that is not shown.

The outer package member 22 is formed, for example, of a laminate film having a metal layer and resin layers formed on both faces of the metal layer. In the laminate film, an outer resin layer is formed on the face of the metal layer exposed to outer side of the battery, and an inner resin layer is formed on the face of the inner side of the battery that is opposed to a power generating element such as the wound electrode body 10. The metal layer assumes the most important role of preventing entry of water, oxygen, and light, and thus protecting the content. Aluminum (Al) or stainless is preferred from the viewpoints of lightness, extensibility, price, and workability. As the outer resin layer, a resin material having beauty of appearance, toughness, flexibility, and the like, such as nylon or polyethylene terephthalate (PET) is used. Since the inner resin layer is a part that melts by heat or ultrasonic wave, and mutually fuses, a polyolefin resin is appropriate, and cast polypropylene (CPP) is often used. Between the metal layer and each of the outer resin film and the inner resin film, an adhesive layer may be provided as necessary.

The outer package member 22 is provided with a recess part formed in the direction toward the outer resin layer side from the inner resin layer side, for example, by deep drawing, for accommodating the wound electrode body 10, and the inner resin layer is provided to be opposed to the wound electrode body 10. The opposed inner resin layers of the outer package member 22 are in close contact with each other in the outer edge part of the recess part by fusion or the like. Between the outer package member 22, and each of a positive electrode lead 16 and a negative electrode lead 17, a close contact film 23 is disposed so as to improve the adhesivity between the inner resin layer of the outer package member 22, and each of the positive electrode lead 16 and the negative electrode lead 17 formed of a metal material.

Figure 2:
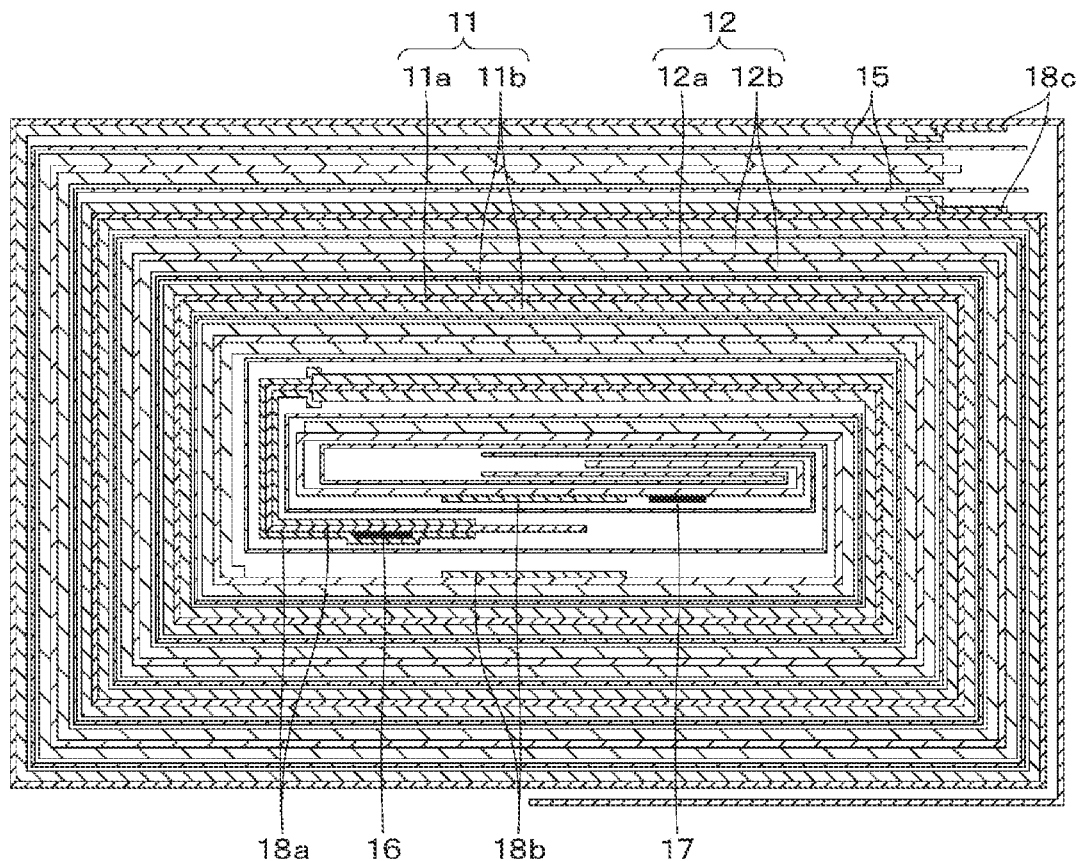
FIG. 2 is a sectional view for illustrating a wound electrode body according to an embodiment of the present technology.
Figure 3:
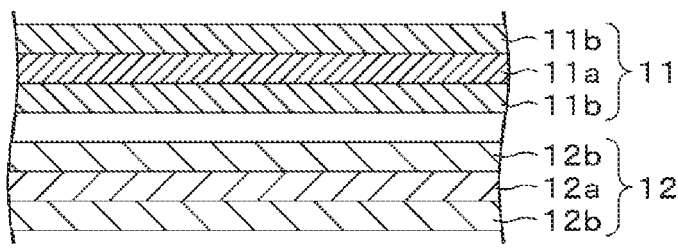
FIG. 3 is an enlarged sectional view of a part of a wound electrode body according to an embodiment of the present technology.

Referring to FIG. 2, one example of the wound electrode body 10 is described below. FIG. 2 illustrates a sectional structure along the line I-I of the wound electrode body 10 shown in FIG. 1. The wound electrode body 10 is prepared by stacking a positive electrode 11 and a negative electrode 12 with a separator 15 interposed therebetween, and winding the stack, and the outermost circumferential part of the wound electrode body 10 is protected by a protective tape as necessary. The wound electrode body 10 is formed by stacking the positive electrode 11, the separator 15, and the negative electrode 12, winding the stack two or more times so that the area taken up is minimized; and then compressing the wound stack. Further, the wound electrode body 10 has a main internal structure including an electrode lead of the positive electrode side (positive electrode lead) 16 and an electrode lead of the negative electrode side (negative electrode lead) 17, and covering materials 18a, 18b, 18c.

The positive electrode 11 includes a positive electrode collector 11a, and a positive electrode active material layer 11b formed on both faces of the positive electrode collector 11a. The positive electrode 11 may have a part in which the positive electrode active material layer 11b is formed on either face of the positive electrode collector 11a. The positive electrode 11 is formed by coating a metal electrode in the form of a foil obtained by cutting an aluminum rolled foil to have a predetermined dimension, with a positive electrode active material. This is because such a positive electrode has favorable characteristics as the positive electrode including excellent conductivity and chemical properties as the electrode, excellent workability in the winding process, and lightness and low price.

The negative electrode 12 includes a negative electrode collector 12a, and a negative electrode active material layer 12b formed on both faces of the negative electrode collector 12a. The negative electrode 12 may have a part in which the negative electrode active material layer 12b is formed on either face of the negative electrode collector 12a. The negative electrode 12 is formed by coating a metal electrode obtained by cutting and molding a copper rolled foil to have a predetermined dimension, with a negative electrode active material for almost the same reason as for the positive electrode 11.

Both the electrode lead 16 of the positive electrode side and the electrode lead 17 of the negative electrode side are intended to take the electromotive force generated in the laminate structure outside. The electrode leads are formed by using an aluminum alloy thin plate or the like having excellent conductivity, and durability against chemical reactions inside the laminate structure.

The electrolyte can be a liquid electrolyte (namely, electrolytic solution), a gel electrolyte or a solid electrolyte. When the electrolyte is an electrolytic solution, the outer package member 22 is filled with the electrolytic solution, and the wound electrode body 10 is immersed in the electrolytic solution filling the outer package member 22. When the electrolyte is a gel electrolyte or a solid electrolyte, the electrolyte is provided between at least one of the positive electrode 11 and the negative electrode 12, and the separator 15. In this case, the wound electrode body 10 has a structure in which the positive electrode 11 and the negative electrode 12 are stacked with the separator 15 and the layer of the electrolyte interposed therebetween, and the stack is wound. In this case, the separator 15 may be omitted.

The electrolytic solution can be, for example, a non-aqueous electrolytic solution containing a non-aqueous solvent, and an electrolyte salt dissolved in the solvent. The gel electrolyte is in a gel form having electrochemical characteristics suited for an electrolyte layer in each of electrodes. The gel never becomes liquid and leaks, and has acceptability to bending and deflection. As the gel electrolyte satisfying these characteristics, for example, those homogenously dispersing an electrolytic solution in a polymer matrix are preferred. Examples of the solid electrolyte include a polymer solid electrolyte based on an ion conductive polymer, and an inorganic solid electrolyte based on an ion conductive inorganic material.

The separator 15 is formed of a material that prevents the positive electrode 11 and the negative electrode 12 from coming into electric contact with each other while allowing free ion migration between the positive electrode 11 and the negative electrode 12 to a practically sufficient extent, and is preferably formed of microporous polypropylene, for example.

Each of the covering materials 18a, 18b, 18c provided in respective positions is formed of a material having insulating properties capable of ensuring electric insulation (for example, insulating polymer material) even when one electrode and the other electrode come close to each other due to application of pressing force to the laminate structure from outside, or when a cutting burr occurs in an end part of the positive electrode collector 11a or the negative electrode collector 12a. Also each of the covering materials 18a, 18b, 18c has a material and a thickness having such a mechanical strength that breakage or damage will not occur even if one electrode deforms due to application of such a pressing force and comes into contact with the other electrode, and is formed by adhering an insulating tape such as a tape of polyimide or polypropylene to an appropriate site.

In the end part where the electrode lead 17 of the negative electrode 12 side is joined, a covering material is omitted. This is because negative electrodes are opposed to each other with the separator 15 interposed therebetween, and a short circuit will not occur if a cutting burr in the end part breaks through the separator.

Examples of the materials for the constituents of the battery described above will be described more specifically.

As the positive electrode material capable of occluding and releasing lithium, for example, a lithium-containing compound is preferred. This is because high energy density is obtained. Examples of the lithium-containing compound include a composite oxide containing lithium and a transition metallic element, and a phosphate compound containing lithium and a transition metallic element. Among these, those containing at least one selected from the group consisting of cobalt (Co), nickel (Ni), manganese (Mn), and iron (Fe) as the transition metallic element are preferred. This is because higher voltage is obtained.

Examples of the composite oxide containing lithium and a transition metallic element include lithium cobalt composite oxides ($LixCoO_2$), lithium nickel composite oxides ($LixNiO_2$), lithium nickel cobalt composite oxides ($Li_xNi_{1-z}Co_zO_2$ ($0<z<1$)), lithium nickel cobalt manganese composite oxides ($Li_xNi_{(1-v-w)}Co_vMn_wO_2$ ($0<v+w<1$, $v>0$, $w>0$)), and lithium manganese composite oxides ($LiMn_2O_4$) or lithium manganese nickel composite oxides ($LiMn_{2-t}Ni_tO_4$ ($0<t<2$)) having a spinel structure. Among these, composite oxides containing cobalt are preferred. This is because high capacitance is obtained, and excellent cycle characteristics are obtained. Examples of the phosphate compound containing lithium and a transition metallic element include lithium iron phosphate compounds ($LiFePO_4$) and lithium iron manganese phosphate compounds ($LiFe_{1-u}Mn_uPO_4$ ($0<u<1$)), $LixFe_{1-y}M2_yPO_4$ (wherein, M2 represents at least one selected from the group consisting of manganese (Mn), nickel (Ni), cobalt (Co), zinc (Zn), and magnesium (Mg). x is a value within the range of $0.9<x<1.1$).

Examples of other positive electrode materials capable of occluding and releasing lithium include oxides such as vanadium oxide ($V_2O_5$), titanium dioxide ($TiO_2$), and manganese dioxide ($MnO_2$), disulfides such as iron disulfide ($FeS_2$), titanium disulfide ($TiS_2$), and molybdenum disulfide ($MoS_2$), chalcogenides not containing lithium such as niobium diselenide ($NbSe_2$) (particularly, laminar compounds and spinel compounds), lithium-containing compounds containing lithium, and sulfur, and conductive polymers such as polyaniline, polythiophene, polyacetylene, and polypyrrole. Of course, the positive electrode materials capable of occluding and releasing lithium may be those other than the above examples. The positive electrode materials cited above may be used in any combination of two or more materials.

The negative electrode active material layer includes one or two or more negative electrode materials capable of occluding and releasing lithium, as the negative electrode active material, and may contain other materials such as a binder or an electric conducting material as necessary. In this case, it is preferred that a chargeable capacitance in the negative electrode material capable of occluding and releasing lithium is larger than a discharge capacitance of the positive electrode. As the negative electrode material capable of occluding and releasing lithium, for example, a carbon material can be recited. Examples of the carbon material include easily-graphitizable carbon, non-graphitizable carbon having a surface interval of (002) face of 0.37 nm or more, and graphite having a surface interval of (002) face of 0.34 nm or less. More specific examples include pyrolytic carbons, cokes, glassy carbon fibers, fired organic polymer compounds, activated carbon and carbon blacks. Among these, cokes include pitch coke, needle coke and petroleum coke. The fired organic polymer compound is obtained by carbonizing a phenol resin, a furan resin or the like by firing at an appropriate temperature. Since the carbon material experiences little change in the crystal structure associated with occlusion and release of lithium, high energy density is obtained and excellent cycle characteristics are obtained. The carbon material is preferred because it also functions as an electric conducting material. The carbon material may have any form including a fiber form, a globular form, a particulate form or a scale form.

Examples of the negative electrode material capable of occluding and releasing lithium other than the carbon material as described above include materials capable of occluding and releasing lithium and having at least one of a metallic element and a semimetallic element as a constituent element. This is because high energy density is obtained. Such a negative electrode material may be a simple substance, an alloy or a compound of a metallic element or a semimetallic element, or may be the one partly having a phase of one or two or more of these. The term "alloy" in this invention encompasses those containing one or more metallic elements and one or more semimetallic elements, in addition to those composed of two or more metallic elements. The "alloy" may contain a nonmetallic element. This structure includes a solid solution, a eutectic (eutectic mixture), an intermetallic compound, or coexisting two or more of these.

Examples of the metallic element or the semimetallic element described above include metallic elements or semimetallic elements capable of forming an alloy with lithium. Specific examples include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). Among these, at least one selected from silicon and tin is preferred, and silicon is more preferred. This is because the high ability to occlude and release lithium leads to high energy density.

Examples of the negative electrode material having at least one of silicon (Si) and tin (Sn) include a simple substance, an alloy or a compound of silicon, a simple substance, an alloy or a compound of tin, and a material partly having a phase of one or two or more of these.

Examples of the alloy of silicon include those containing at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr), as a second constituent element other than silicon.

Examples of the alloy of tin include those containing at least one selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr), as a second constituent element other than tin.

Examples of the compound of tin or the compound of silicon include those containing oxygen (O) or carbon (C), and the compound of tin or the compound of silicon may contain the second constituent element as described above in addition to tin (Sn) or silicon (Si).

In particular, as the negative electrode material containing at least one of silicon (Si) and tin (Sn), for example, those containing tin (Sn) as a first constituent element, and containing a second constituent element and a third constituent element in addition to tin (Sn) are preferred. Of course, the negative electrode material may be used together with the negative electrode material as described above. The second constituent element is at least one selected from the group consisting of cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cerium (Ce), hafnium (Hf), tantalum (Ta), tungsten (W), bismuth (Bi) and silicon (Si). The third constituent element is at least one selected from the group consisting of boron (B), carbon (C), aluminum (Al), and phosphorus (P). This is because the cycle characteristics are improved by containing the second element and the third element.

Among these, preferred is a CoSnC containing material that contains tin (Sn), cobalt (Co), and carbon (C) as constituent elements, wherein the content of carbon (C) is in the range between 9.9% by mass and 29.7% by mass, inclusive, and a ratio of cobalt (Co) to a total of tin (Sn) and cobalt (Co) (Co/(Sn+Co)) is in the range between 30% by mass and 70% by mass, inclusive. This is because high energy density is obtained, and excellent cycle characteristics are obtained with such composition ranges. The SnCoC containing material may further contain other constituent element as necessary.

As the other constituent element, for example, silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga) or bismuth (Bi) is preferred, and two or more of these may be contained. This is because the capacitance characteristics or the cycle characteristics are further improved. The SnCoC containing material has a phase containing tin (Sn), cobalt (Co) and carbon (C), and it is preferred that this phase has a low crystalline or amorphous structure. Also, in the SnCoC containing material, it is preferred that at least part of carbon which is a constituent element binds with a metallic element or a semimetallic element which is another constituent element. While aggregation or crystallization of tin (Sn) or the like is considered as a cause of deterioration in cycle characteristics, such aggregation or crystallization is suppressed by binding of carbon with other element.

The binder contains either one or two or more of, for example, synthetic rubbers and polymer materials. Examples of the synthetic rubber include styrene butadiene rubbers, fluorine rubbers, and ethylene-propylene-diene. Examples of the polymer material include polyvinylidene fluoride and polyimide.

The electric conducting material contains either one or two or more of, for example, carbon materials. Examples of the carbon material include graphite, carbon black, acetylene black, and Ketjen black. The electric conducting material may be a metallic material, a conductive polymer or the like as long as it is a material having conductivity.

A separator has a function of separating the positive electrode and the negative electrode from each other and preventing a short circuit of the current caused by contact between the both electrodes while allowing passage of lithium ions, and can be prepared with a porous film formed of, for example, a synthetic resin or ceramic. Further, in order to ensure the safety of the lithium ion battery, the separator may have a shutdown function. The shutdown function used herein refers to a function of blocking the current by closure of pores of the microporous film when the temperature of the battery rises, and acts to prevent a thermal runaway of the battery. As the material having these functions, polyolefin, a polyethylene microporous film, and the like are recited.

In order to further improve the safety, a technique of covering either or both faces of the polyethylene microporous film with a heat resistant porous layer, or stacking a non-woven fabric made of heat resistant fibers on either or both faces of the polyethylene microporous film, and a technique of containing ceramic powder in these layers have been proposed. For example, a non-aqueous electrolytic battery separator in which a heat resistant porous layer composed of a heat resistant polymer such as aromatic aramid, polyimide, polyvinylidene fluoride or the like is stacked on either or both faces of the polyethylene microporous film by a wet coating method is known, and these may be used. In the case of forming this polymer compound layer, for example, a solution of a polymer material may be applied on a base material layer, and then the base material layer may be dried, or a base material layer may be immersed in the solution, and then the base material layer may be dried.

An electrolytic solution contains a solvent and an electrolyte salt.

Examples of the solvent that can be used include ethylene carbonate (EC), propylene carbonate (PC), butylene carbonate, dimethyl carbonate, diethyl carbonate, ethylmethyl carbonate, methylpropyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyl oxazolidinone, N,N'-dimethyl imidazolidinone, nitromethane, nitroethane, sulfolane, trimethyl phosphate, and dimethylsulfoxide. This is because when the electrolytic solution is used in an electrochemical device such as a battery, excellent capacitance, cycle characteristics and storage characteristics are obtained. These solvents may be used singly or in combination of two or more kinds. Among these, as the solvent, it is preferred to use those containing at least one selected from the group consisting of ethylene carbonate, propylene carbonate, dimethyl carbonate, diethyl carbonate, and ethylmethyl carbonate. This is because sufficient effect is obtained. In this case, a solvent containing a mixture of ethylene carbonate or propylene carbonate which is a high-viscosity (high relative permittivity) solvent (for example, relative permittivity $εr≥30$), and dimethyl carbonate, diethyl carbonate or ethylmethyl carbonate which is a low-viscosity (low relative permittivity) solvent (for example, viscosity ≤1 mPa·s) is particularly preferably used. This is because dissociation of the electrolyte salt and the mobility of ions are improved, and higher effect is obtained. However, the solvent may be materials other than those described above.

The electrolyte salt contains, for example, one or two or more light metal salts such as a lithium salt. Example of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroalminate ($LiAlCl_4$), lithium hexafluorosilicate ($Li_2SiF_6$), lithium chloride (LiCl), and lithium bromide (LiBr). Among these, at least one selected from the group consisting of lithium hexafluorophosphate, lithium tetrafluoroborate, lithium perchlorate, and lithium hexafluoroarsenate is preferred, and lithium hexafluorophosphate is more preferred. This is because resistance of the electrolytic solution decreases. However, the electrolyte salt may be materials other than those described above.

The above-described electrolytic solution may be gelated with a matrix polymer. The matrix polymer should be miscible with the electrolytic solution prepared by dissolving the electrolyte salt in the solvent, and be capable of gelating the electrolytic solution. Examples of the matrix polymer include polymers containing vinylidene fluoride (VdF), ethylene oxide (EO), propylene oxide (PO), acrylonitrile (AN), or methacrylonitrile (MAN) as a repeating unit. Such a polymer may be used singly or in a mixture of two or more kinds. The gel electrolyte is preferred because high ion conductivity (for example, 1 mS/cm or more at room temperature) is obtained, and leakage of the liquid is prevented. Also, the electrolytic solution may contain a metal oxide.

Next, the outline of the method for producing the lithium ion secondary battery is described focusing on the step of forming a covering material, and the step of applying a pressing force on the laminate structure.

The positive electrode 11 in which the gel electrolyte is applied to an electrode applying part as described above, the separator 15, and the negative electrode 12 in which the gel electrolyte is applied to an electrode applying part are stacked, and the positive electrode 11 is joined with the electrode lead 16 of the positive electrode side, and the negative electrode 12 is joined with the electrode lead 17 of the negative electrode side, and thus a laminate structure in a flat form that has not been wound is formed.

Then before winding the laminate structure in a spiral pattern, the covering material 18a is adhered to a partial or the whole face of the part opposed to the negative electrode collector in a collector exposed face of the inner circumferential part of the positive electrode 11 to give a cover including the surface of the electrode lead 16 of the positive electrode side. The covering material 18a has insulating properties and mechanical strength, and is formed of an insulating tape such as a polyethylene terephthalate (PET), polypropylene (PP), or polyimide (PI) tape. For covering a cutting burr of the collector end part of the positive electrode 11 with the covering material 18a, it is necessary to paste the covering material 18a so as to completely cover the end part of the positive electrode 11, so that the productivity can be low. In such a case, the area near the inner circumferential end part of the positive electrode collector is not covered with the covering material 18a, and as an alternative, the covering material 18b formed of an insulating tape such as a polyethylene terephthalate (PET), polypropylene (PP), or polyimide (PI) tape is adhered to the collector exposed face of the negative electrode 12 that is opposed to the positive electrode collector exposed face. Regarding the outer circumferential end part of the positive electrode 11, in the part opposed to the negative electrode collector with the separator interposed therebetween, in the collector exposed face of the positive electrode 11, the covering material 18c having insulating properties and mechanical strength, formed of an insulating tape such as a polyethylene terephthalate (PET), polypropylene (PP), or polyimide (PI) tape is adhered. When the risk of occurrence of an internal short circuit by a foil cutting burr or the like is low, part or all of the covering materials 18a, 18b, 18c can be omitted.

The inner circumference in the present art refers to the region close to the electrode end part situated near the center of the wound electrode body in the end part of the longitudinal direction of the electrode, and the outer circumference refers to the region close to the electrode end part situated closer to the outer package member in the end part of the longitudinal direction of the electrode.

After adhering each of the covering materials 18a, 18b, 18c in the manner as described above, the laminate structure is wound in a slightly flat spiral pattern, and a pressing force from outside is further applied to thin the wound laminate structure. At this time, even if application of the pressing force causes approach of the end part of the positive electrode 11 to the negative electrode 12, or approach of the end part of the negative electrode 12 to the positive electrode 11, it is possible to prevent the electrodes from coming into contact with each other to result in occurrence of an electrical short circuit by each of the covering materials 18a, 18b, 18c. When the gel electrolyte is used, a heating press may be carried out as a process for impregnating the positive electrode, the negative electrodes, and the separator with the electrolytic solution. When a liquid electrolytic solution is used, the electrolytic solution can be injected after inserting the element that is thinned to be flat into the laminate.

The present art improves the safety in the nailing test without lowering the energy density. Hereinafter, the present art is described by referring to attached drawings. The present art provides a battery in which in the winding starting part of the negative electrode in the wound electrode body, an insulator covers a partial or the whole face of the negative electrode collector surface surrounding a space where a positive electrode or a positive electrode collector is absent among spaces surrounded by the negative electrode or the negative electrode collector that are newly formed every time the negative electrode or the negative electrode collector is folded. As shown in the sectional view of FIG. 4, in the battery according to one embodiment of the present art, an insulator 19A is pasted on the negative electrode collector in the specified site as described above.

Figure 5:
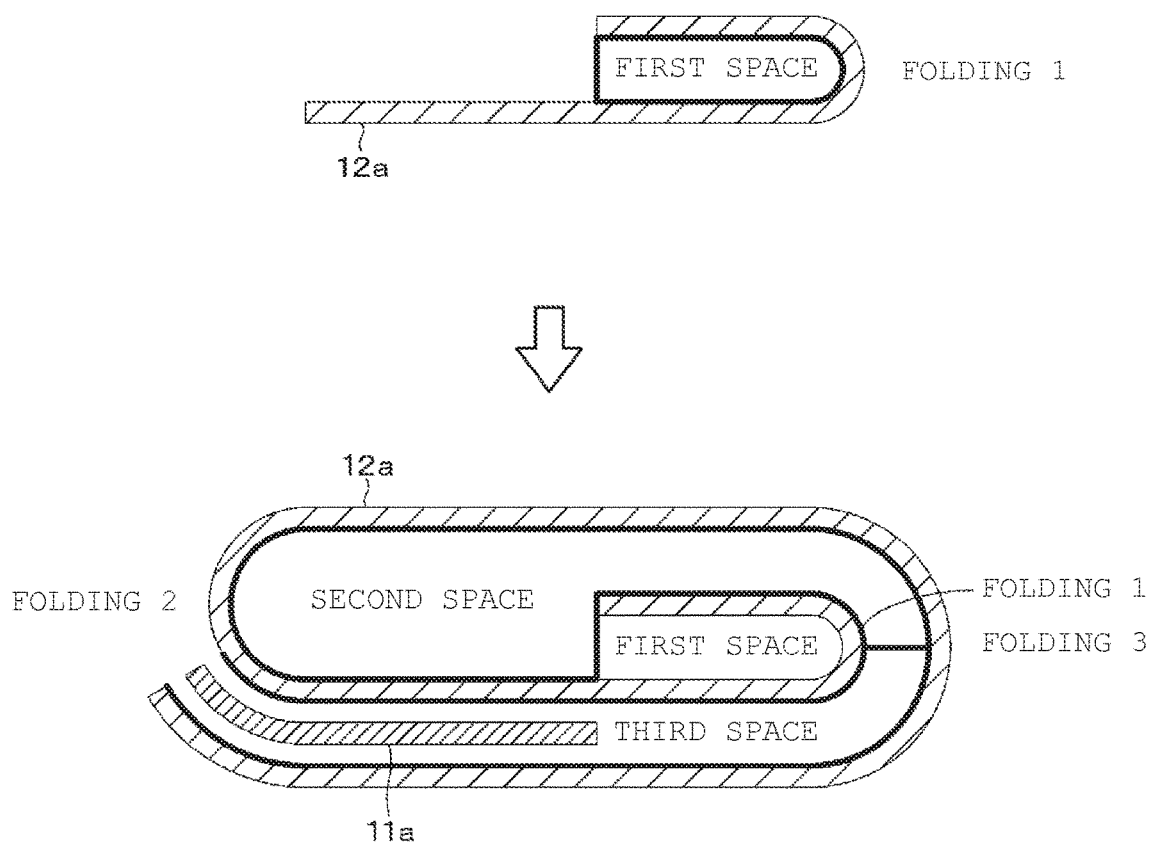
FIG. 5 is a schematic diagram for illustrating the present art according to an embodiment of the present technology.

Referring to FIG. 5, the position for providing an insulator is described. When winding of the negative electrode collector 12a starts from a winding starting end, a space whose top face, bottom face, and one lateral face are surrounded by the negative electrode collector 12a is formed every time folding is made. Assigning the number (1, 2, . . . ) in sequence from the first folding, the space formed by folding N is referred to as the N-th space. The example of FIG. 5 indicates that the first space is formed by folding 1, the second space is formed by folding 2, and the third space is formed by folding 3. In the third space, the positive electrode collector 11a exists while it is sandwiched by the negative electrode collector 12a. In FIG. 5, illustration of the positive electrode active material layer 11b and the negative electrode active material layer 12b is omitted for simplification.

As shown in FIG. 5, among the spaces surrounded by the negative electrode collector 12a that are newly formed every time the negative electrode collector 12a is folded, the spaces where the positive electrode collector 11a is absent are the first space and the second space. A part of the surface of the negative electrode collector 12a that surrounds the first and the second spaces is covered with the insulator 19A. That is, the face on the center side of the negative electrode collector 12a opposed to the inner circumferential side of the winding starting end part of the positive electrode collector 11a is covered with the insulator 19A. It is desired that the insulator 19A cover the maximum possible extent of the negative electrode collector exposed part within the extent of the first space and the second space so as to exert the effect regardless of the part in the battery where the nail sticks. Also regarding the height direction of the battery, it is desired to provide the insulator 19A in a width that is slightly larger than the height of the negative electrode collector 12a so as to exert the effect regardless of the part in the battery where the nail sticks, however, when improvement in nailing safety is desired for a specific area, the insulator 19A can be provided only in or near the part where the stuck nail passes through in the negative electrode collector 12a.

Figure 4:
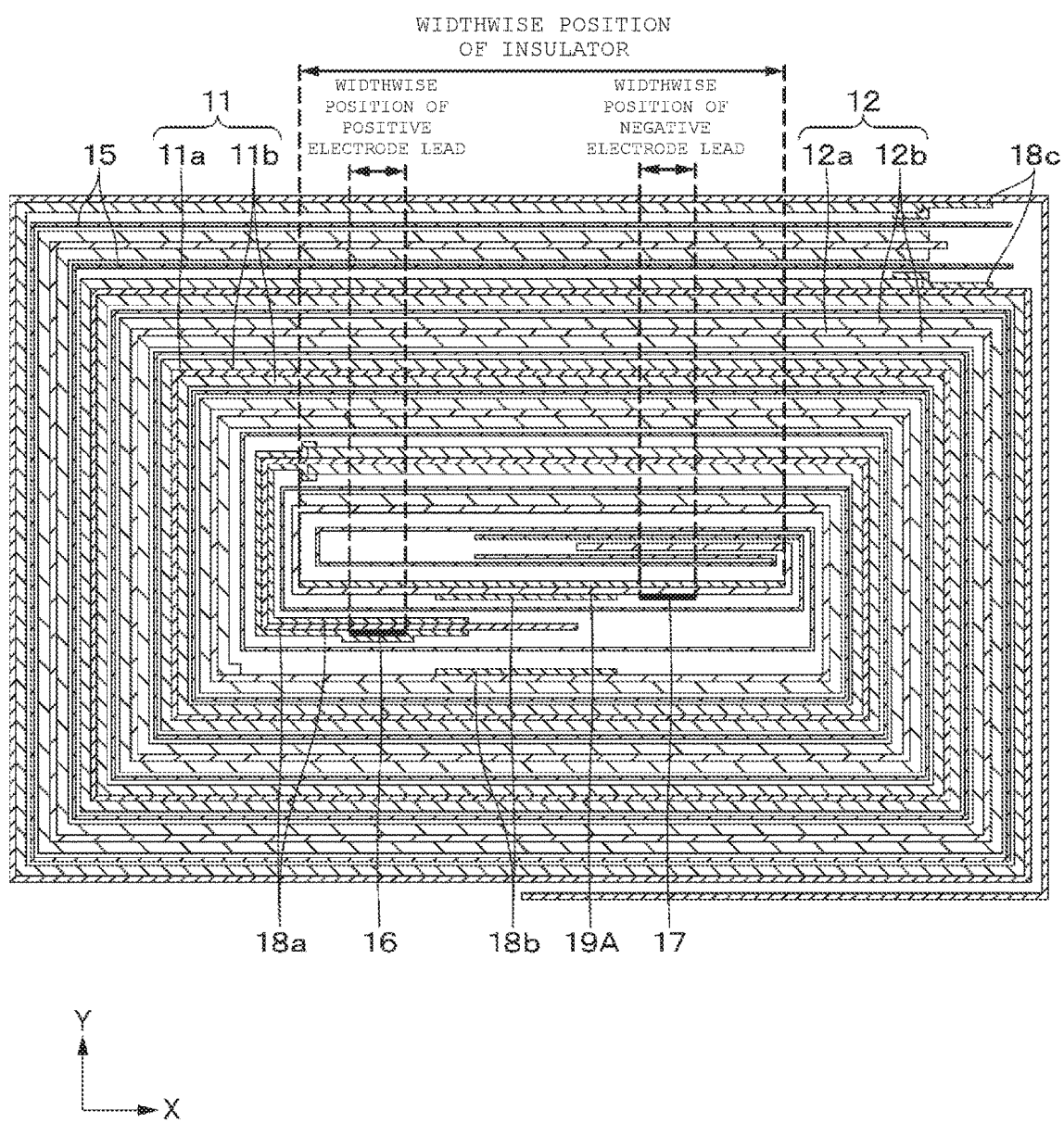
FIG. 4 is a sectional view of one example of a wound electrode body according to an embodiment of the present technology.

One example of the insulator 19A is a covering material that covers a face of the negative electrode collector 12a, and specifically, a polymer film with an adhesive is used. Likewise the covering material 18a, 18b or 18c, a covering material formed of an insulating tape such as a polyethylene terephthalate (PET), polypropylene (PP), or polyimide (PI) tape having insulating properties and mechanical strength is used as the insulator 19A. Regarding other insulators, the materials as mentioned above are used. In the example of FIG. 4, the insulator 19A covers the negative electrode collector 12a in the extent from folding 1 to folding 2 in the schematic view of FIG. 5. The position in the width direction of the battery of the insulator 19A as described above is appropriately referred to as the whole face.

Figure 6:
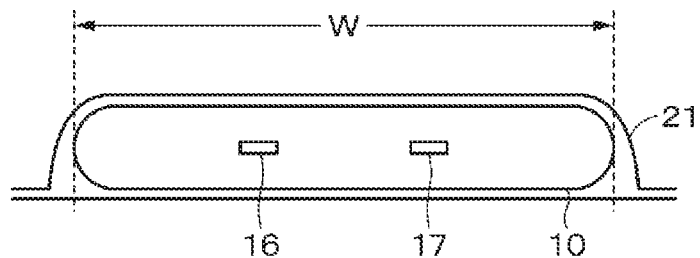
FIG. 6A and FIG. 6B are schematic diagrams for illustrating the present art according to an embodiment of the present technology.
Figure 6:
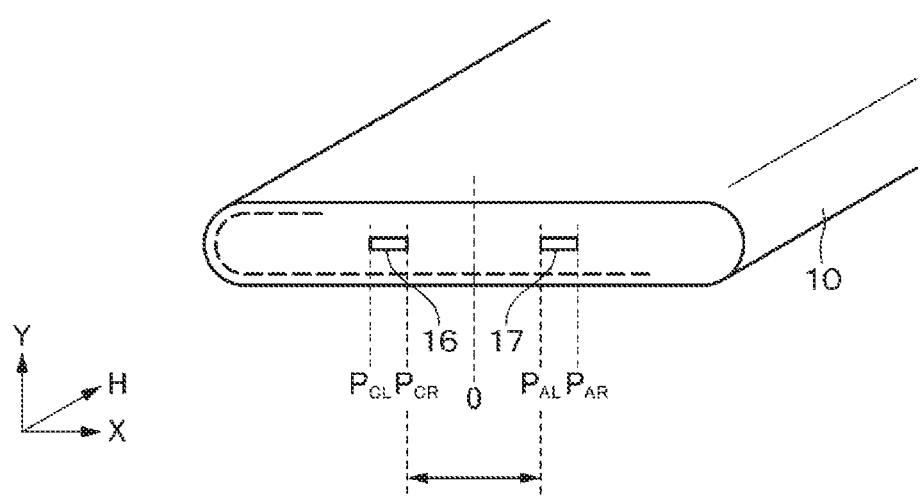

Further, for description of the position where the insulator 19A is provided, a manner of defining a lead drawing out position for the battery 21 in which the wound electrode body 10 is covered with an outer package material is illustrated with reference to FIG. 6. As shown in FIG. 6A, the positive electrode lead 16 and the negative electrode lead 17 are attached to the electrode device (wound electrode body) 10 having an electrode device width W. The width direction of the electrode device is defined as X direction, the thickness direction of the electrode device is defined as Y, and the height direction of the electrode device is defined as H. Positions PCL, and PCR in the electrode device width direction where the positive electrode lead 16 exists are also defined. Likewise, positions PAL and PAR in the electrode device width direction where the negative electrode lead 17 exists are also defined. The coordinates of these positions are represented by "−" [mm] on the left and "+" [mm] on the right taking the middle point of the electrode device width W as 0.

In FIG. 4, the widthwise position of the positive electrode lead 16 means the extent between the positions PCL and PCR, and the widthwise position of the negative electrode lead 17 means the extent between the positions PAL and PAR. In the configuration shown in FIG. 4, the widthwise position of the insulator 19A is larger than the extent including the widthwise position of the positive electrode lead 16 and the widthwise position of the negative electrode lead 17. Further, in FIG. 4, a sign A as in the insulator 19A indicates the position in the Y direction of the insulator 19A. That is, the insulator disposed at the position close to the terminal end part of the innermost circumference of the negative electrode collector 12a is marked with a sign A.

Figure 7:
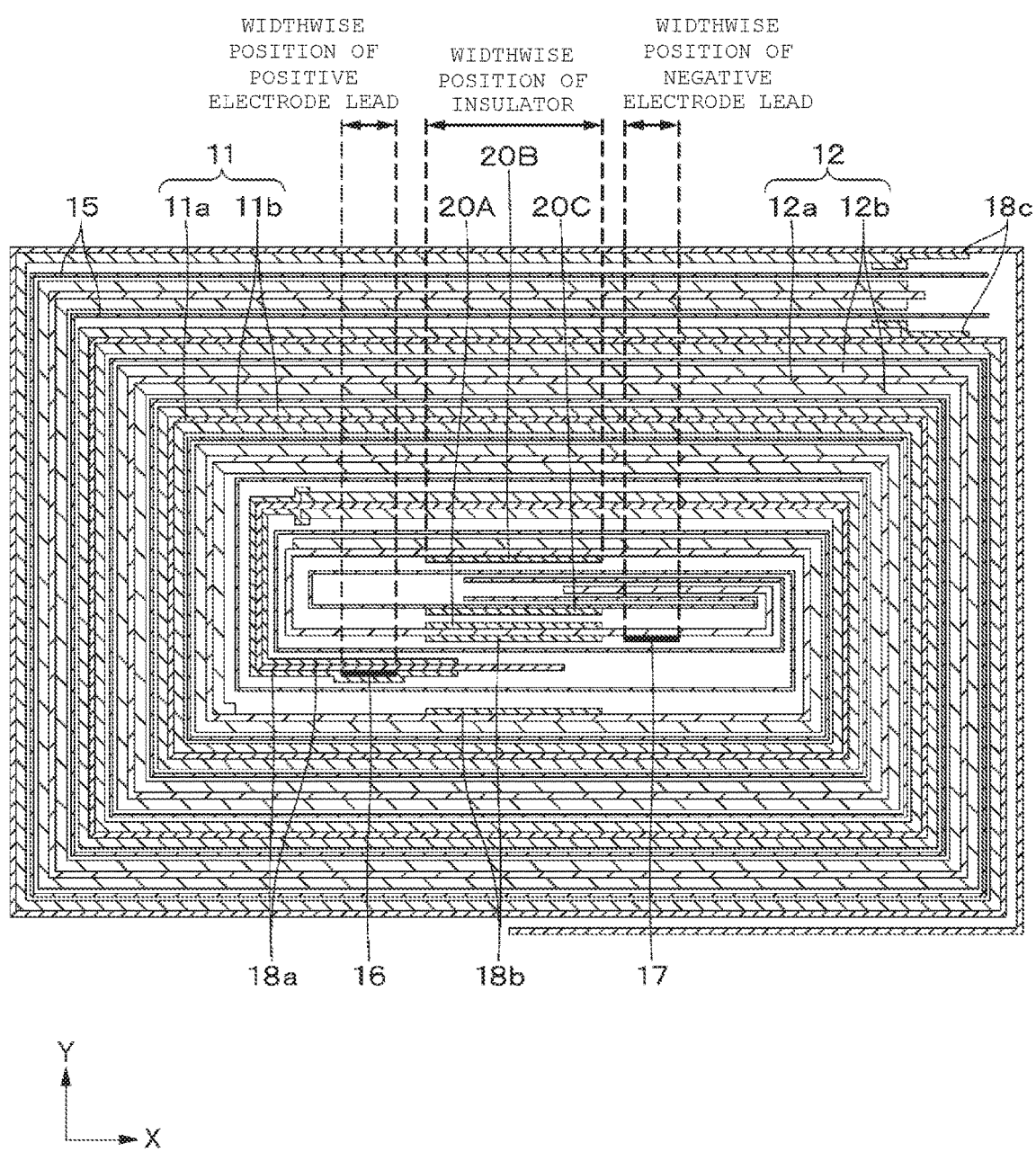
FIG. 7 is a sectional view of another example of a wound electrode body according to an embodiment of the present technology.

FIG. 7 illustrates other example of the attaching position of the insulator. Regarding the X direction (width direction), insulators 20A, 20B, 20C are arranged between the widthwise position of the positive electrode lead 16 and the widthwise position of the negative electrode lead 17, namely in the extent that does not overlap with the positions of these leads. The widthwise position of the battery of the insulator that does not overlap with the positions of electrode leads is called "lead-to-lead position". The insulators 20A, 20B, 20C are attached in different positions in the Y direction. To be more specific, the insulator disposed in the position close to the terminal end part of the innermost circumference of the negative electrode collector 12a is the insulator 20A. The insulator 20B is disposed in a position farther from the terminal end part of the innermost circumference of the negative electrode collector 12a than the insulator 20A (namely, outer circumferential side). The insulator 20C is disposed on the separator 15. While the insulators 20A, 20B and 20C are illustrated in FIG. 7, one or more of these may be provided.

Figure 8:
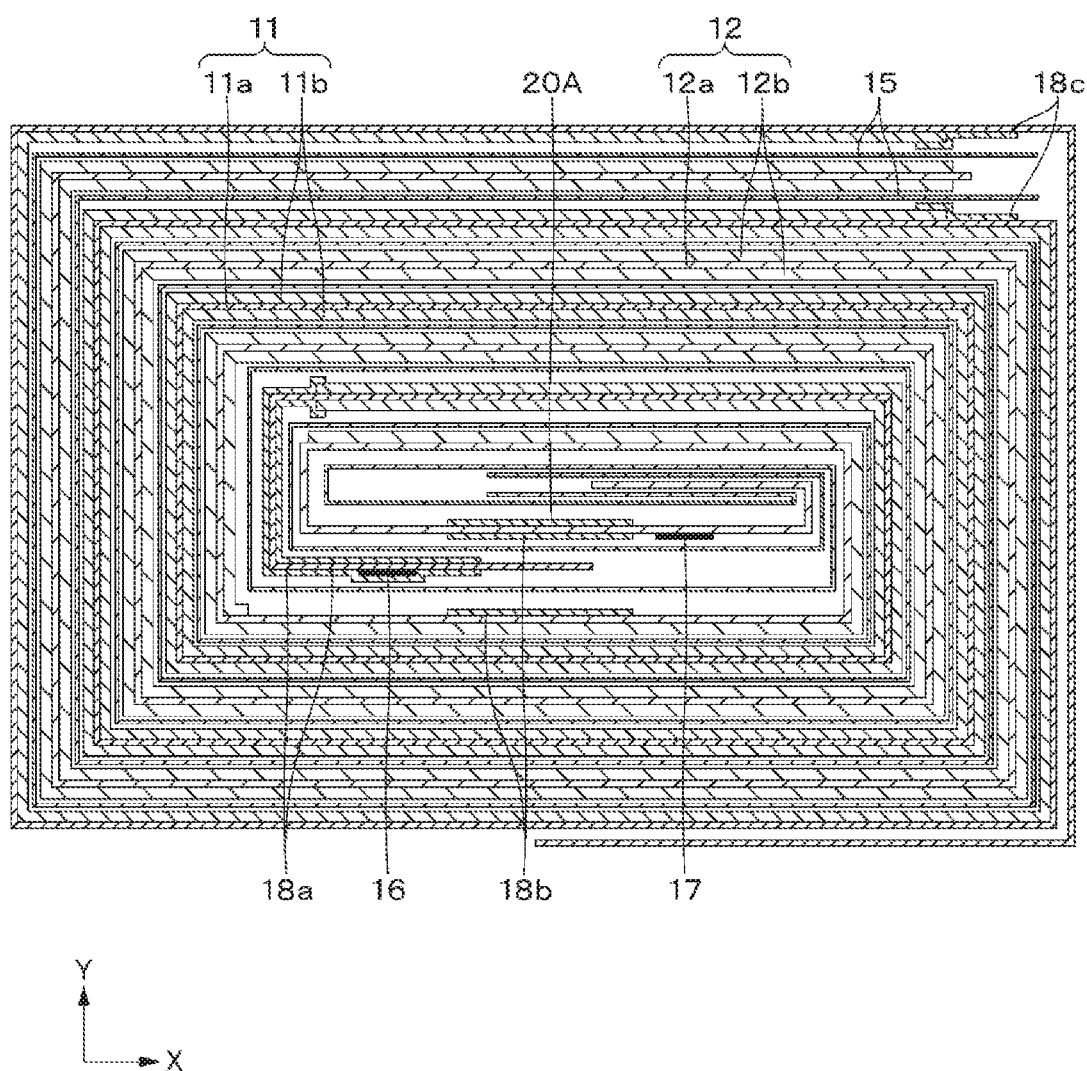
FIG. 8 is a sectional view for illustrating example of a wound electrode body according to an embodiment of the present technology.
Figure 10:
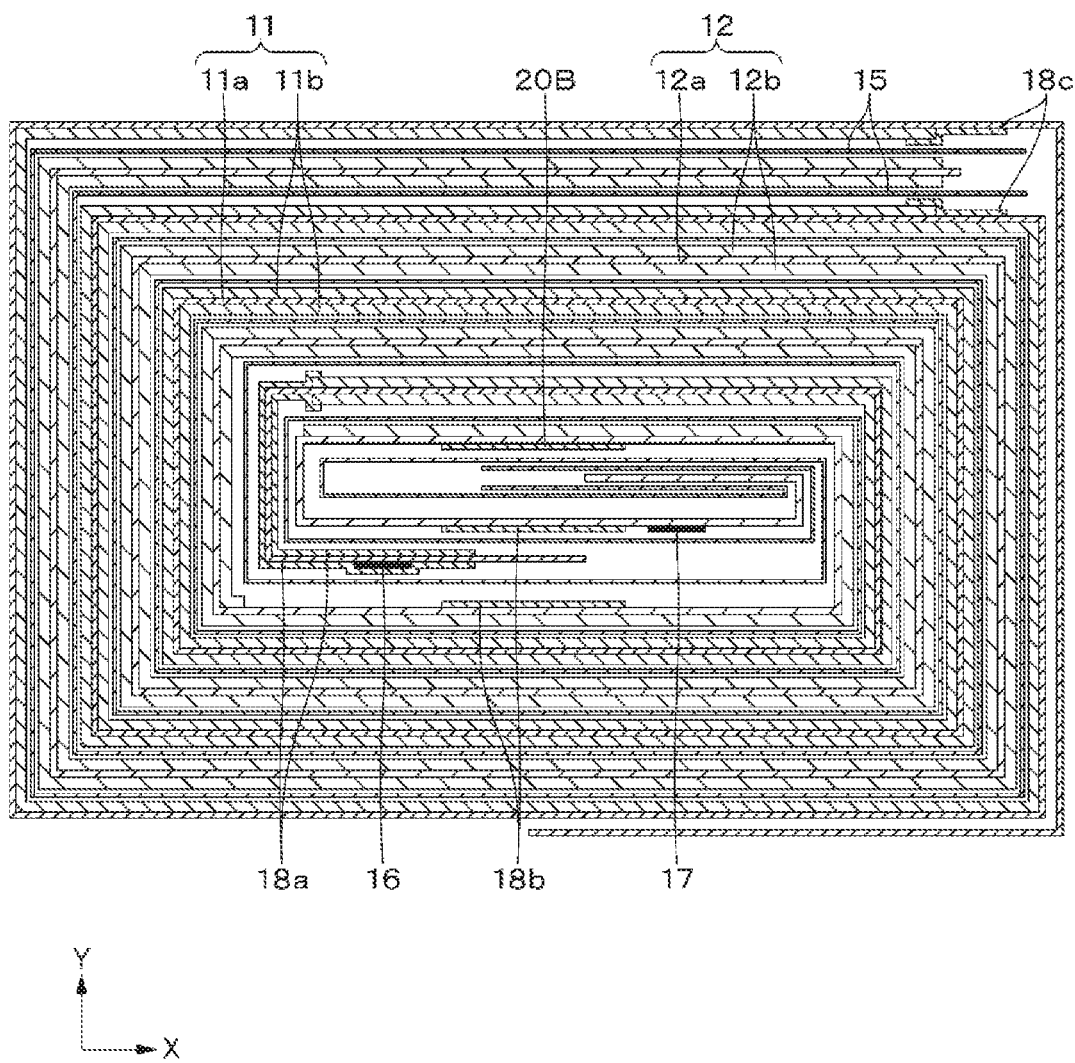
FIG. 10 is a sectional view for illustrating example of a wound electrode body according to an embodiment of the present technology.
Figure 12:
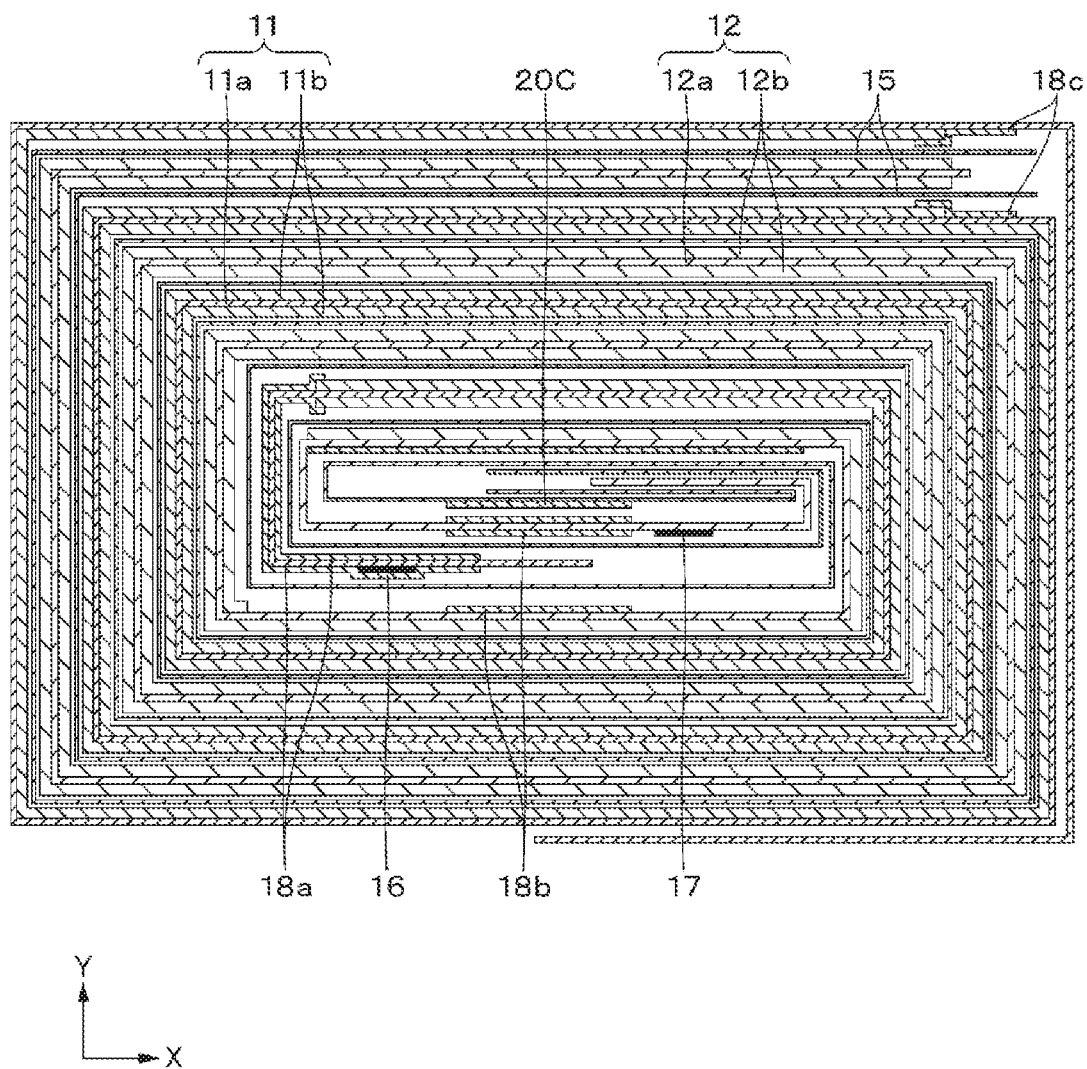
FIG. 12 is a sectional view for illustrating example of a wound electrode body according to an embodiment of the present technology.

A section of the wound electrode body provided with the insulator 20A is shown in FIG. 8, a section of the wound electrode body provided with the insulator 20B is shown in FIG. 10, and a section of wound electrode body provided with the insulator 20C is shown in FIG. 12.

Figure 9:
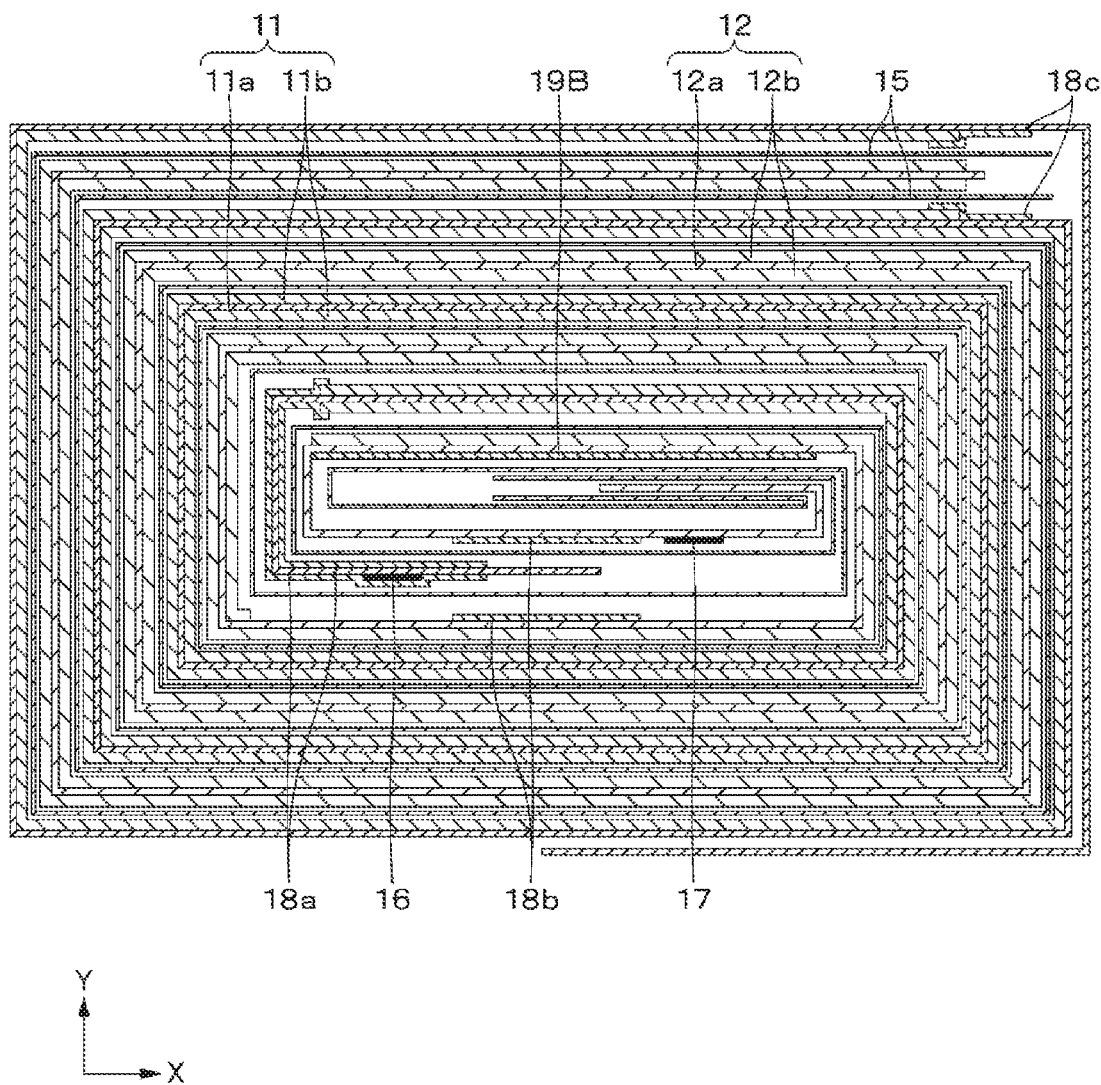
FIG. 9 is a sectional view for illustrating example of a wound electrode body according to an embodiment of the present technology.

In the configuration shown in FIG. 9, the insulator 19B is disposed in the position that is larger than the extent including the widthwise position of the positive electrode lead 16 and the widthwise position of the negative electrode lead 17 as is the case with the configuration shown in FIG. 4. However, regarding the Y direction, the insulator 19B is disposed in a position farther from the terminal end part of the innermost circumference of the negative electrode collector 12a than the insulator 19A.

Figure 11:
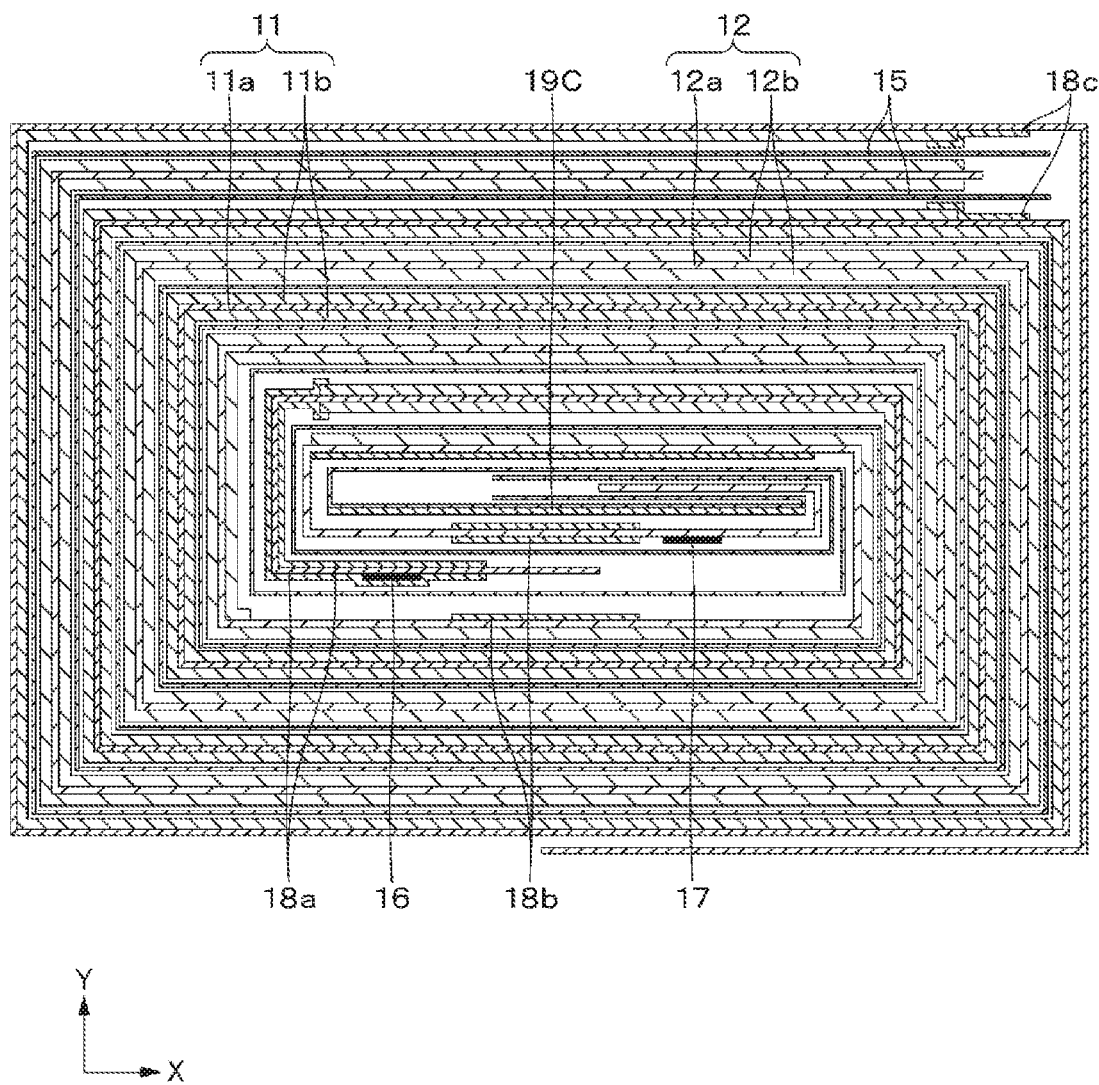
FIG. 11 is a sectional view for illustrating example of a wound electrode body according to an embodiment of the present technology.

In the configuration shown in FIG. 11, the insulator 19C is disposed in the position that is larger than the extent including the widthwise position of the positive electrode lead 16 and the widthwise position of the negative electrode lead 17 as is the case with the configuration shown in FIG. 4. However, regarding the Y direction, the insulator 19C is disposed on the separator 15.

For the batteries provided with the insulators in the manner as described above, a nailing test was carried out, and the result is shown in Table 1 below. The melting points of the insulators were measured by using a differential scanning calorimeter (DSC). In measurement, a sample having a thickness of 0.1 mm was cut out into a piece of 5 mg to conform with the shape of the measuring container, and after sealing the piece in the apparatus, the temperature was raised at 10° C./min, and a DSC curve was measured, and the temperature of the apex of the peak of the melting point of the base material in the DSC curve was determined as a melting point. As a reference, α-alumina powder of the same volume as the sample sealed in another container was used.

(a thermal runaway does not occur) voltage determined by the nailing test was 4.3 V. The thickness of the cell at the time of charging was 4.51 mm.

Example 2

The case where the insulator 19A is a pressure-sensitive adhesive tape formed of PP (polypropylene) having a thickness of 30 μm and a melting point of 163° C. The nailing OK voltage determined by the nailing test was 4.4 V. The thickness of the cell at the time of charging was 4.51 mm.

Example 3

The case where the insulator 19A is a pressure-sensitive adhesive tape formed of PET (polyethylene terephthalate) having a thickness of 30 m and a melting point of 253° C. The nailing OK voltage determined by the nailing test was 4.4 V. The thickness of the cell at the time of charging was 4.51 mm.

Example 4

The case where the insulator 19A is a pressure-sensitive adhesive tape formed of PI (polyimide) having a thickness of 30 μm. The nailing OK voltage determined by the nailing test was 4.4 V.

TABLE 1

| | | Position | Material | Form | Melting point [° C.] | Tape thickness [μm] | Widthwise direction | Thickness of cell at the time of charging [mm] | Nailing OK voltage [V] |
|---|---|---|---|---|---|---|---|---|---|
| Example | 1 | A | PE | Pressure-sensitive adhesive tape | 130 | 30 | Whole face | 4.51 | 4.3 |
| | 2 | A | PP | Pressure-sensitive adhesive tape | 163 | 30 | Whole face | 4.51 | 4.4 |
| | 3 | A | PET | Pressure-sensitive adhesive tape | 253 | 30 | Whole face | 4.51 | 4.4 |
| | 4 | A | PI | Pressure-sensitive adhesive tape | — | 30 | Whole face | 4.51 | 4.4 |
| | 5 | A | PI | Coating | — | 30 | Whole face | 4.51 | 4.4 |
| | 6 | A | PET | Pressure-sensitive adhesive tape | 253 | 30 | Tab face | 4.48 | 4.4 |
| | 7 | B | PET | Pressure-sensitive adhesive tape | 253 | 30 | Whole face | 4.51 | 4.4 |
| | 8 | B | PET | Pressure-sensitive adhesive tape | 253 | 30 | Tab face | 4.48 | 4.4 |
| | 9 | C | PET | Pressure-sensitive adhesive tape | 253 | 30 | Whole face | 4.51 | 4.4 |
| | 10 | C | PET | Pressure-sensitive adhesive tape | 253 | 30 | Tab face | 4.48 | 4.4 |
| Comparative Example | 1 | — | — | — | — | — | — | 4.48 | 4.2 |

Example 1 to Example 5 are batteries in which the insulator 19A is disposed in the maximum possible extent in the cell width direction in a position A in the thickness direction (Y axial direction) as shown in Table 1 (see FIG. 4).

Example 1

The case where the insulator 19A is a pressure-sensitive adhesive tape formed of PE (polyethylene) having a thickness of 30 μm and a melting point of 130° C. The nailing OK The thickness of the cell at the time of charging was 4.51 mm.

Example 5

The case where insulator 19A is provided by applying PI (polyimide) in a thickness of 30 μm. The nailing OK voltage determined by the nailing test was 4.4 V. The thickness of the cell at the time of charging was 4.51 mm. The material of PI (polyimide) may be applied.

Example 6

Example 6 is a battery in which the insulator 20A is disposed in a position A in a tab face of the widthwise position (see FIG. 8). The case where the insulator 20A is a pressure-sensitive adhesive tape formed of PET (polyethylene terephthalate) having a thickness of 30 μm and a melting point of 253° C. The nailing OK voltage determined by the nailing test was 4.4 V. The thickness of the cell at the time of charging was 4.48 mm.

Example 7

Example 7 is a battery in which the insulator 19B is disposed in a position B in the whole face of the widthwise position (see FIG. 9). The case where the insulator 19B is a pressure-sensitive adhesive tape formed of PET (polyethylene terephthalate) having a thickness of 30 μm and a melting point of 253° C. The nailing OK voltage determined by the nailing test was 4.4 V.

The thickness of the cell at the time of charging was 4.51 mm.

Example 8

Example 8 is a battery in which the insulator 20B is disposed in a position B in a tab face of the widthwise position (see FIG. 10). The case where the insulator 20B is a pressure-sensitive adhesive tape formed of PET (polyethylene terephthalate) having a thickness of 30 μm and a melting point of 253° C. The nailing OK voltage determined by the nailing test was 4.4 V. The thickness of the cell at the time of charging was 4.48 mm.

Example 9

Example 9 is a battery in which the insulator 19C is disposed in a position C in the whole face of the widthwise position (see FIG. 11). The case where the insulator 19C is a pressure-sensitive adhesive tape formed of PET (polyethylene terephthalate) having a thickness of 30 μm and a melting point of 253° C. The nailing OK voltage determined by the nailing test was 4.4 V. The thickness of the cell at the time of charging was 4.51 mm.

Example 10

Example 10 is a battery in which the insulator 20C is disposed in a position C in a tab face of the widthwise position (see FIG. 12). The case where the insulator 20C is a pressure-sensitive adhesive tape formed of PET (polyethylene terephthalate) having a thickness of 30 μm and a melting point of 253° C. The nailing OK voltage determined by the nailing test was 4.4 V. The thickness of the cell at the time of charging was 4.48 mm.

Comparative Example 1

Comparative Example 1 is a battery having a wound electrode body as shown in FIG. 2. In other words, an insulator is not provided. The nailing OK voltage determined by the nailing test was 4.2 V. The thickness of the cell at the time of charging was 4.48 mm.

Regarding the aforementioned Examples 1 to 10, and Comparative Example 1, the collector foil was formed to have the following thicknesses: aluminum foil: 15 μm, copper foil: 8 μm, and separator: 7 μm.

These experimental results revealed that Examples 1 to 10 of the present art are capable of increasing the nailing OK voltage, as compared with Comparative Example 1 and achieve higher safety.

In Examples 1 to 4, the material of the tape for covering the position A is varied, and the nailing OK voltage differs between Example 1 and Example 2. The battery having subjected to the nailing test was disassembled. In the battery of Example 1 in which PE was used as the material of the tape, the PE tape near the hole where the nail passed through greatly melted and the hole extended, whereas in the battery of Example 2 in which PP was used, the PP tape remained in such a manner that the nail was rolled into the hole where the nail passed through. This reveals that the contact condition between the negative electrode collector and the nail varies depending on the melting point of the tape, and the tape having a melting point of about 145° C. prevents the contact between the negative electrode collector and the nail, and exerts the effect of improving the safety. The nailing OK voltage of Example 2 was 4.4 V, which was higher than the nailing OK voltage (4.3 V) of Example 1. Therefore, it is more preferred that the melting point is 163° C. or more.

In Example 5, a polyimide vanish having completed imidation was applied in the same position as in Example 4. The result showed that a nailing OK voltage comparable to that in Example 4 was obtained, and the way of formation of the covering material did not influence on the safety.

In Example 6, the cell widthwise position where the tape is pasted was set not to overlap with the widthwise position where an electrode lead exists. The result showed that the cell thickness at the time of charging is thinned while the nailing safety comparable to that in Example 3 is maintained.

Example 7 and Example 8 show the results of the cases where the tape is pasted in a position B, and Example 9 and Example 10 show the results of the cases where the tape is pasted in a position C on the separator, and it was found that the effect was unchanged in any case.

Figure 13:
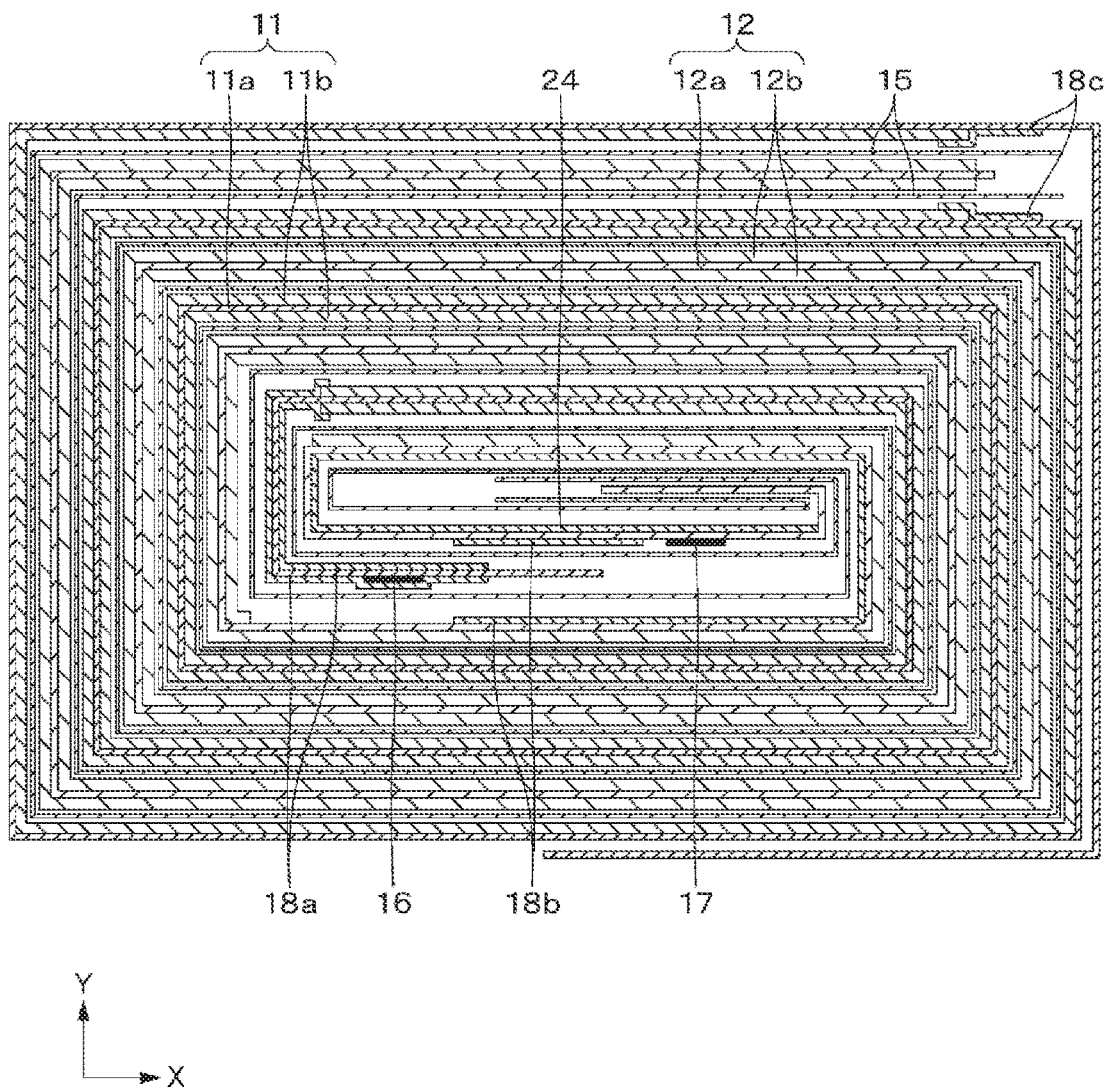
FIG. 13 is a sectional view of a modified example of a wound electrode body according to an embodiment of the present technology.

FIG. 13 illustrates a configuration of a modified example. An insulator 24 is continuously provided from the end position of folding 1 in FIG. 5 to the position where it comes into contact with the outer part of the covering material 18b for preventing a short circuit that has been originally provided.

A covering material may be provided in a plurality of sites without limited to either one site of positions A, B, C in the Y direction in the foregoing description. However, too large thickness of the covering material causes increase in thickness of the battery, and thus it is necessary to select an appropriate thickness.

Figure 14:
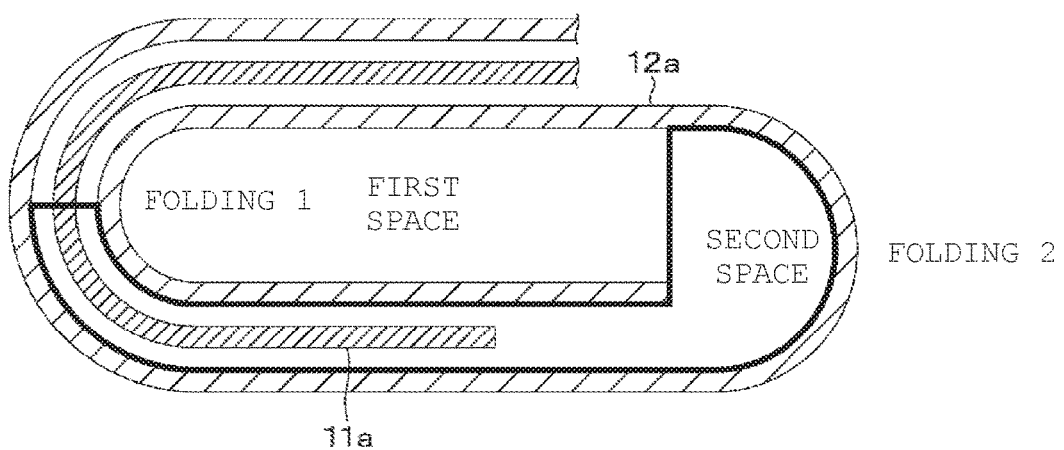
FIG. 14 is a schematic diagram for illustrating the present art according to an embodiment of the present technology.

The one embodiment described above is an example in which the negative electrode collector 12a is wound from the center part of the wound electrode body as shown in FIG. 5, and the positive electrode collector 11a does not exist in the first space and the second space formed by folding 1 and folding 2. In contrast, when the negative electrode collector 12a starts as shown in FIG. 14, the first space is formed by folding 1 and the second space is formed by folding 2, and the positive electrode collector 11a exists in the second space. Therefore, a partial or the whole face of the negative electrode collector surface surrounding the first space is covered with the insulator. A partial or the whole face of the separator surface may be covered with the insulator.

Further, a part where the foil exposed part of the positive electrode and the foil exposed part of the negative electrode are opposed to each other with the separator interposed therebetween may be provided on the outer circumferential side of the wound structure so as to further improve the safety. The opposed part of the foil exposed parts may be formed by plane foils without application of an electrode on both sides, or may be formed by foil exposed parts having one side on which an electrode is applied.

Figure 15:
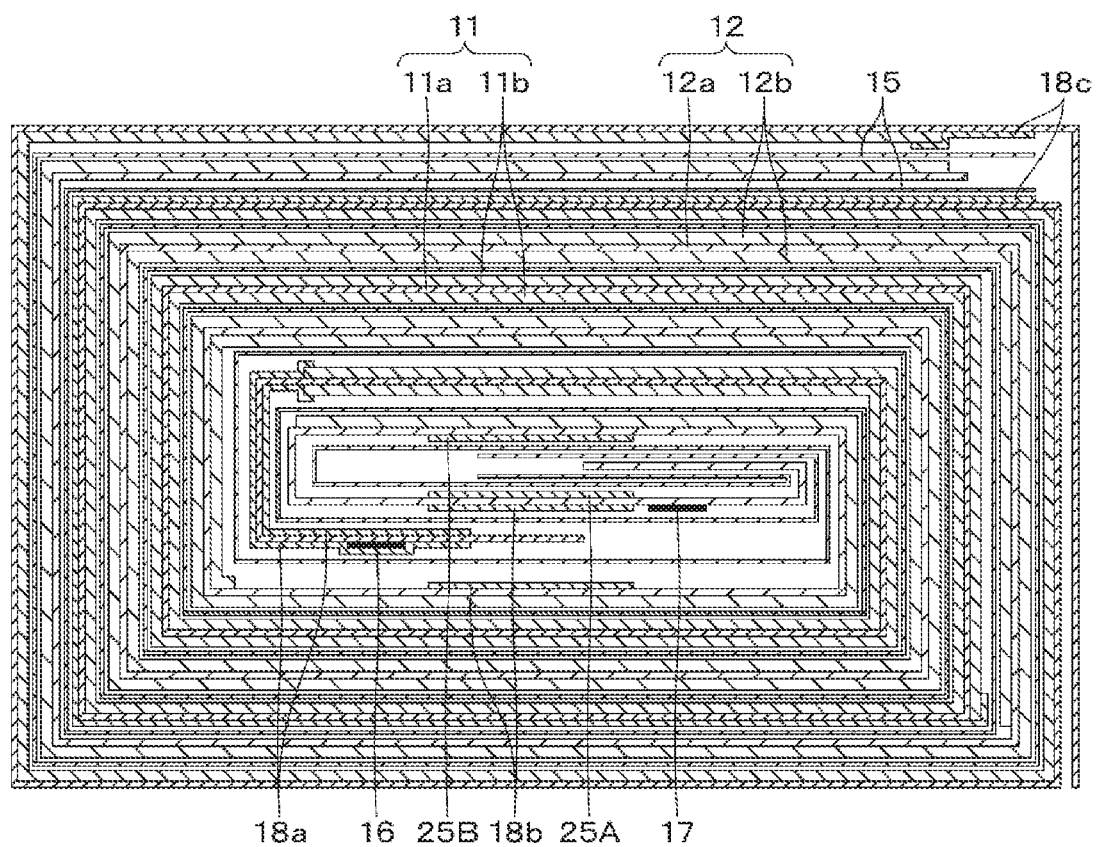
FIG. 15 is a sectional view of still another example of a wound electrode body according to an embodiment of the present technology.

FIG. 15 illustrates one example of such a configuration. In this configuration, the one-side-coated part foil collector exposed part of the positive electrode 11 and the one-side-coated part collector exposed part of the negative electrode 12 are opposed to each other. The battery has a part where the collector exposed face sides of the outer winding side one-side-coated parts of the positive electrode and the negative electrode are opposed to each other.

By employing such a configuration, it is possible to improve the safety at the time of a nailing test compared with a normal structure. The mechanism is as follows.

1. In the part where the positive electrode collector and the negative electrode collector are opposed to each other, a short circuit of low resistance occurs, so that the heat value reduces in the part where the electrode-applied parts are opposed to each other.

2. When it was arranged in the outermost circumference, the heat value reduces in the part where the electrode-applied parts are opposed to each other even in the initial stage of the nailing.

Multiplication of these two effects makes the battery less likely to cause a thermal runaway.

Regarding the current path in the part where the positive electrode collector and the negative electrode collector are opposed to each other, it was found that the main current path is the path where the positive electrode collector and the negative electrode collector are in direct contact with each other, rather than the path that is a short circuit between the positive electrode collector and the negative electrode collector via the nail. These results revealed that it is not necessary for both of the positive negative electrode collector and the negative electrode collector to have exposed metal faces on both sides, and it suffices that the side where the metal face is opposed is provided on the outer circumferential side.

The results of the experiments conducted for the battery having the configuration of FIG. 15 are shown in Table 2 below. The tape position specifies the covering materials 18a to 18c, an insulator 25A, and an insulator 25B in FIG. 15. Regarding the aforementioned Examples 11 to 17, and Comparative Example 2, the collector foil was formed to have the following thicknesses: aluminum foil: 10 μm, copper foil: 6 μm, and separator: 5.5 μm. Thicknesses can be reduced in Examples 11 to 17, compared with Examples 1 to 10, and Comparative Example 1 as described above. Examples 11 to 17 have a structure provided with a part where foils are opposed to each other (hereinafter, referred to as "foil-foil opposed part") in the outer circumference. Therefore, if the batteries are prepared with the same foil thicknesses as those in Examples 1 to 10, the safety is increased too much to evaluate the superiority or inferiority. For this reason, different foil thicknesses as described above are employed in Examples 11 to 17.

TABLE 2

| | | Inner circumferential center part Foil-foil unopposed part tape | | | | | Outer circumferential center part Foil-foil opposed part protective tape | | | |
|---|---|---|---|---|---|---|---|---|---|---|
| | | Tape position | Kind of base material | Melting point (° C.) | Thickness of pressure sensitive adhesion [μm] | Thickness of base material [μm] | Melting point of base material × Thickness of base material [° C. · mm] | Tape position | Kind of base material | Melting point (° C.) | Thickness of pressure sensitive adhesion [μm] |
| Example | 11 | 25A | PET | 253 | 2 | 8 | 2.0 | 18b | PET | 253 | 3 |
| | 12 | 25B | PET | 253 | 2 | 8 | 2.0 | 18b | PET | 253 | 3 |
| | 13 | 25A 25B | PET | 253 | 2 | 8 | 4.0 | 18b | PET | 253 | 3 |
| | 14 | 25A 25B | PET | 253 | 10 | 20 | 10.1 | 18b | PET | 253 | 3 |
| | 15 | 25A 25B | PP | 163 | 3 | 12 | 3.9 | 18b | PET | 253 | 3 |
| | 16 | 25A 25B | PI | — | 5 | 25 | — | 18b | PET | 253 | 3 |
| | 17 | 25A 25B | PI | — | 0 | 25 | — | 18b | PET | 253 | 3 |
| Comparative Example | 2 | — | — | — | — | — | — | 18b | PET | 253 | 3 |

| Outer circumferential center part Foil-foil opposed part protective tape | Inner circumferential center part Foil-foil opposed part protective tape | |
|---|---|---|
| Melting point of base material × | Thickness | Melting point of base material × Thick |

TABLE 2-continued

| | | Thickness of base material [μm] | Thickness of base material [° C. · mm] | Tape position | Kind of base material | Melting point (° C.) | Thickness of pressure sensitive adhesion [μm] | Thickness of base material [μm] | Thickness of base material [° C. · mm] | Nailing OK voltage [V] | Thickness of cell [mm] |
|---|---|---|---|---|---|---|---|---|---|---|---|
| Example | 11 | 12 | 6.1 | 18c | PET | 253 | 3 | 12 | 3.0 | 4.25 | 4.24 |
| | 12 | 12 | 6.1 | 18c | PET | 253 | 3 | 12 | 3.0 | 4.25 | 4.24 |
| | 13 | 12 | 6.1 | 18c | PET | 253 | 3 | 12 | 3.0 | 4.25 | 4.24 |
| | 14 | 12 | 6.1 | 18c | PET | 253 | 3 | 12 | 3.0 | 4.25 | 4.24 |
| | 15 | 12 | 6.1 | 18c | PET | 253 | 3 | 12 | 3.0 | 4.25 | 4.24 |
| | 16 | 12 | 6.1 | 18c | PET | 253 | 3 | 12 | 3.0 | 4.25 | 4.24 |
| | 17 | 12 | 6.1 | 18c | PET | 253 | 3 | 12 | 3.0 | 4.25 | 4.24 |
| Comparative Example | 2 | 12 | 6.1 | 18c | PET | 253 | 3 | 12 | 3.0 | 4.2 | 4.24 |

In Example 11 to Example 17, disposition of an innermost circumferential tape in the part where foils are not opposed to each other (hereinafter, referred to as "foil-foil unopposed part") was examined. In the battery provided with the foil-foil opposed part, basically, an outer side of the battery, which is in contact with air, is likely to diffuse the heat, and the temperature is more likely to rise in a place closer to the center of the battery although the site of heat generation at the time of internal short circuit varies depending on the place in the battery. Therefore, it is supposed that the safety is further improved by employing such a structure that inhibits conduction of heat generated in the foil-foil opposed part on the inner circumferential side where a high current flows even in a low resistance short circuit, to the electrode-applied part. Also from the viewpoint of the heat generation density of the innermost circumference, it is considered that the heat value per volume decreases by disposing a member such as a tape on the innermost circumference.

The inventors considered that it is preferred to dispose the insulators 25A, 25B embodied by a tape or the like in the positions shown in FIG. 15 because increased thickness of the foil-foil opposed part acts to lose the function of the low resistance short circuit of the foil-foil opposed part.

Example 11 to Example 17 show the results of the nailing OK voltages when the insulators 25A, 25B (a tape or a film without pressure-sensitive adhesive) are provided. It was revealed that the nailing OK voltage increases by 0.05 V compared with Comparative Example 2 in which a tape is not provided. The insulators 25A, 25B are considered as effective means for improving the safety without lowering the energy density because they are disposed in the positions not overlapping with the positions of leads where the thickness is maximum. Since these tapes act to lower the heat generation density, the pressure-sensitive adhesive of the tape is not necessarily required, and it was revealed that the same effect was obtained by disposing a film without a pressure-sensitive adhesive or the like (Example 17). Alternatively, a negative electrode mixture, paint composed of an insulator or the like may be applied, however, increase in thickness can be prevented by omitting disposition or application of these in the widthwise region where a lead exists.

The battery device according to one embodiment of the present art described above can be installed in devices such as electronic devices, electromotive vehicles, or power storage devices, or used for supplying these devices with electric power.

Examples of the electronic device include a notebook computer, a smartphone, a tablet-type device, a PDA (personal digital assistant), a cellular phone, a wearable device, a cordless phone handset, a video movie, a digital still camera, an electronic book, an electronic dictionary, a music player, a radio, a headphone, a game player, a navigation system, a memory card, a pacemaker, a hearing aid, an electric power tool, an electric shaver, a refrigerator, an air conditioner, a TV set, a stereo, a water heater, a microwave, a dish washer, a washing machine, a drier, an lighting apparatus, a toy, a medical device, a robot, a load conditioner, and a signal. For these electronic devices, the battery according to the present art is used as a power source in the configuration of a battery pack. The battery pack has a control unit or a controller that controls charging and discharging of the battery, and an outer packing housing the battery. The controller includes a processor.

Examples of the electromotive vehicle include a railway vehicle, a golf cart, an electric cart, and an electric car (including a hybrid car), and the battery device is used as a driving power source or an auxiliary power source of these.

Examples of the power storage device include power sources for electric power storage for constructions typified by a house or for electric power facilities.

The following describes a specific example of a power storage system using the battery device of the present art described above among the aforementioned application examples.

Examples of the configuration of the power storage system are as follows. A first power storage system is a power storage system in which a power storage device is charged by a power generating device that generates power from renewable energy. A second power storage system is a power storage system that has a power storage device and supplies an electronic device connected to the power storage device with electric power. A third power storage system is an electronic device supplied with electric power from a power storage device. These power storage systems are put in operation as a system that is designed to efficiently supply electric power in cooperation with an external power supply network.

Further, a fourth power storage system is an electromotive vehicle including a convertor that converts electric power supplied from a power storage device into a driving force of the vehicle, and a controller that performs information processing concerning vehicle control based on information about the power storage device. A fifth power storage system is an electric power system including an electric power information transmitting and receiving unit that transmits and receives a signal to and from other device via a network, the power storage system controlling charging and discharging of the power storage device described above based on the information received by the transmitting and receiving unit. A sixth power storage system is an electric power system that is supplied with electric power from the aforementioned power storage device, or supplies the power storage device with electric power from a power generating device or an electric power network.

Figure 16:
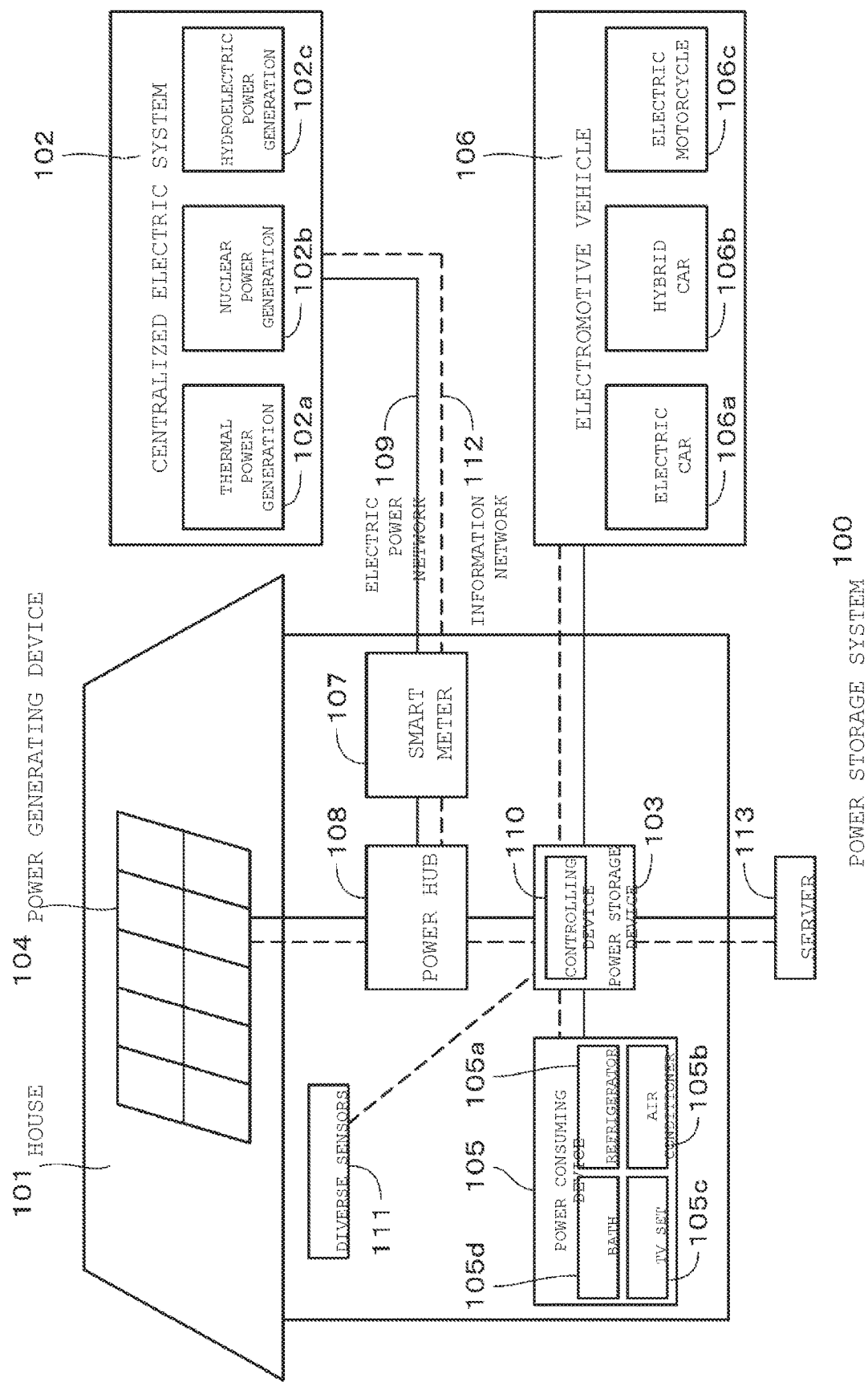
FIG. 16 is a schematic view showing a power storage system for house according to an embodiment of the present technology.

Referring to FIG. 16, an example where the power storage device using the battery of the present art is applied to a power storage system for house is described. For example, in a power storage system 100 for a house 101, electric power is supplied to a power storage device 103 from a centralized electric system 102 of thermal power generation 102a, nuclear power generation 102b, hydroelectric power generation 102c or the like via an electric power network 109, an information network 112, a smart meter 107, a power hub 108, and the like. In addition, the power storage device 103 is supplied with electric power from an independent power source such as a power generating device 104 in a house. The electric power supplied to the power storage device 103 is stored. The electric power to be used in the house 101 is supplied by using the power storage device 103. The same power storage system can be used not only for the house 101 but also for a building.

The house 101 is provided with the power generating device 104, a power consuming device 105, the power storage device 103, a controller 110 that controls each device, the smart meter 107, and diverse sensors 111 for acquiring diverse pieces of information. These devices are connected with each other by the electric power network 109 and the information network 112. As the power generating device 104, a solar cell, a fuel cell or the like is used, and the generated electric power is supplied to the power consuming device 105 and/or the power storage device 103. The power consuming device 105 is a refrigerator 105a, an air conditioner 105b which is an air conditioning system, a TV set 105c which is a television receiving set, a bath (bath) 105d or the like. Further, the power consuming device 105 includes an electromotive vehicle 106. The electromotive vehicle 106 is an electric car 106a, a hybrid car 106b, or an electric bike 106c.

The battery of the present art is applied to the power storage device 103. The battery of the present art may be configured, for example, by a lithium ion secondary battery described above. The smart meter 107 has a function of measuring consumption of commercial electric power, and transmitting the measured consumption to an electric power company. The electric power network 109 may be either one or a combination of DC power feeding, AC power feeding, and non-contact power feeding.

Examples of the diverse sensors 111 include a human sensor, a light intensity sensor, an object sensor, a power consumption sensor, a vibration sensor, a contact sensor, a temperature sensor, and an infrared sensor. The information acquired by the diverse sensors 111 is transmitted to the controller 110. According to the information from the sensors 111, weather conditions, human conditions and the like are grasped and the power consuming device 105 is automatically controlled to minimize the consumption of energy. Further, the controller 110 is capable of transmitting information about the house 101 to an external electric power company or the like via the Internet.

The power hub 108 performs branching of a power line, conversion between DC and AC or the like processing. As a communication method of the information network 112 connected with the controller 110, a method of using a communication interface such as UART (Universal Asynchronous Receiver-Transmitter: transmitter-receiver circuit for asynchronous serial communication), and a method of utilizing a sensor network according to a wireless communication standard such as Bluetooth (registered trademark), ZigBee (registered trademark), Wi-Fi or the like are known. Bluetooth (registered trademark) method is applied to multimedia communication, and enables communication of one-to-many connection. ZigBee (registered trademark) uses a physical layer of IEEE (Institute of Electrical and Electronics Engineers) 802.15.4. IEEE802.15.4 is a name of short range wireless network standards called PAN (Personal Area Network) or W (Wireless) PAN.

The controller 110 is connected with an external server 113. The server 113 may be managed by either one of the house 101, an electric power company or a service provider. The information transmitted or received by the server 113 is, for example, information about consumed electric power, information about life pattern, power rates, weather information, natural disaster information, and information about electricity trading. These pieces of information may be transmitted to or received from the power consuming device (for example, a television receiving set) in the house, or may be transmitted to or received from a device (for example, a cellular phone) outside the house. These pieces of information may be displayed on a device having a display function, such as, for example, a television receiving set, a cellular phone, or a PDA (Personal Digital Assistants).

The controller 110 that controls diverse parts is configured by a CPU (Central Processing Unit) or a processor, an RAM (Random Access Memory), an ROM (Read Only Memory) and the like, and in this example, housed in the power storage device 103. The controller 110 is connected with the power storage device 103, the power generating device 104 inside the house, the power consuming device 105, the diverse sensors 111, and the server 113 by the information network 112, and has, for example, the function of adjusting the consumption of commercial electric power and the generation of electric power. Besides the above, a function of conducting electricity trading in the electricity market may be provided.

As described above, not only electric power from the centralized electric system 102 such as the thermal power generation 102a, the nuclear power generation 102b, the hydroelectric power generation 102c or the like, but also electric power generated by the power generating device 104 (solar power generation, wind power generation) inside the house can be stored in the power storage device 103. Therefore, even when the electric power generated by the power generating device 104 inside the house varies, it is possible to conduct the control of keeping the amount of electric power to be delivered outside constant, or discharging as needed. In one exemplary manner of use, electric power obtained by solar power generation is stored in the power storage device 103, and late-night electric power having a low rate is stored in the power storage device 103 during the night-time, and the electric power stored in the power storage device 103 is used during the daytime when the electric rate is high.

In this example, while the case where the controller 110 is housed in the power storage device 103 is described, the controller 110 may be housed in the smart meter 107 or may be configured alone. Further, the power storage system 100 may be used for a plurality of households in a multi-family apartment building, or may be used for a plurality of single-family houses.

Figure 17:
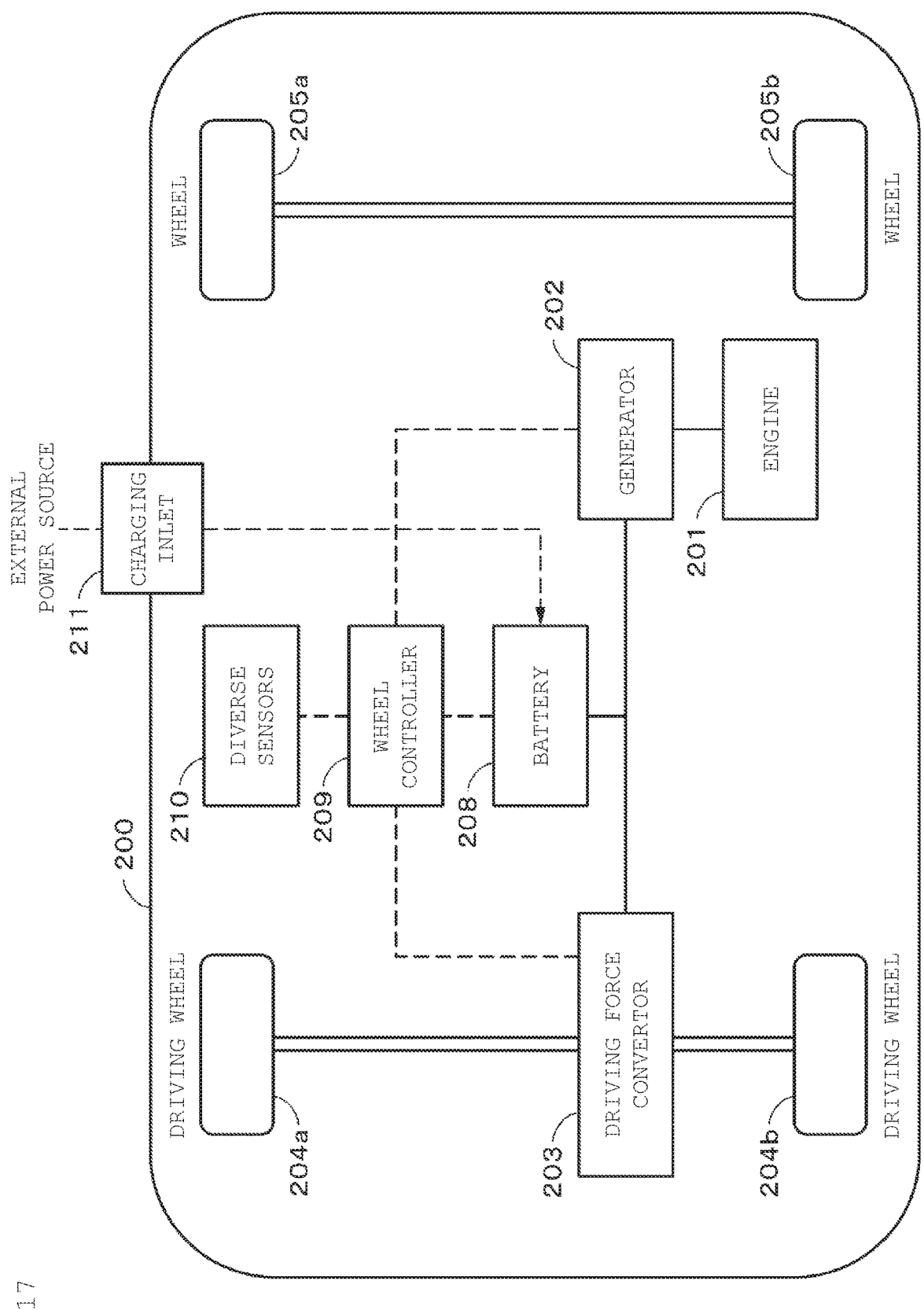
FIG. 17 is a schematic view that schematically shows one example of a configuration of a hybrid vehicle employing a series hybrid system according to an embodiment of the present technology.

Referring to FIG. 17, an example where the present art is applied to a power storage system in vehicle is described. FIG. 17 schematically shows one example of a configuration of a hybrid vehicle employing a series hybrid system to which the present art is applied. A series hybrid system is a vehicle that runs on an electric power to driving force convertor using the electric power that is generated by a generator driven by an engine, or the electric power that has been generated in this manner and temporarily stored in the battery.

In a hybrid vehicle 200, an engine 201, a generator 202, an electric power to driving force convertor 203, a driving wheel 204a, a driving wheel 204b, a wheel 205a, a wheel 205b, a battery 208, a vehicle controller 209, diverse sensors 210, and a charging inlet 211 are installed. The battery of the present art described above is applied to the battery 208.

The hybrid vehicle 200 runs on the electric power to driving force convertor 203 as a power source. One example of the electric power to driving force convertor 203 is a motor. The electric power to driving force convertor 203 is actuated by the electric power of the battery 208, and the rotary force of the electric power to driving force convertor 203 is transmitted to the driving wheels 204a, 204b. By using direct current-alternate current (DC-AC) conversion or reverse conversion (AC-DC conversion) in a necessary point, the application is accepted regardless of whether the electric power to driving force convertor 203 is an AC motor or a DC motor. The diverse sensors 210 controls the rotation number of the engine or controls the opening of the throttle (not shown) (throttle opening) via the vehicle controller 209. The diverse sensors 210 include a speed sensor, an acceleration sensor, an engine speed sensor, and the like.

The rotary force of the engine 201 is transmitted to the generator 202, and electric power generated by the generator 202 by the rotary force can be stored in the battery 208.

When the hybrid vehicle 200 decelerates by the brake mechanism (not shown), the resistance force at the time of the deceleration is added to the electric power to driving force convertor 203 as the rotary force, and regenerated electric power generated by the electric power to driving force convertor 203 by the rotary force is stored in the battery 208.

The battery 208, when connected with a power source outside the hybrid vehicle 200, can be supplied with electric power through the charging inlet 211 as an input port from the external power source, and can store the supplied electric power.

Although not illustrated in the drawing, an information processing device that conducts an information processing regarding vehicle control based on the information about the secondary battery may be provided. One example of such an information processing device is an information processing device displaying the remaining battery level based on the information about the remaining level of the battery.

The above description was made while taking a series hybrid car that runs by a motor using electric power generated by a generator driven by an engine, or electric power that has be generated in this manner and stored once in the battery, as an example. However, the present art can be effectively applied for a parallel hybrid car that uses outputs of both of the engine and the motor as a driving source, and uses the following three modes while appropriately switching the mode: running only on the engine, running only on the motor, and running on the engine and the motor. Further, the present art can be applied to a so-called electromotive vehicle that runs by drive only on a driving motor without using an engine.

While one embodiment of the present art has been specifically described, the present art is not limited to the above-described one embodiment, but can be modified in various ways based on the technical idea of the present art. For example, the configuration, method, step, shape, material, numerical value, and the like recited in the above-described embodiment are merely examples, and a configuration, method, step, shape, material, numerical value, and the like that are different from these may be used as necessary.

The present technology is described below in a further detail according to an embodiment.

(1) A battery having a wound electrode body obtained by winding a positive electrode and a negative electrode with a separator interposed therebetween,
  wherein in an inner circumferential part of the wound electrode body, an insulator covers a partial or the whole face of the separator or a negative electrode collector surface surrounding a space where a positive electrode or a positive electrode collector is absent among spaces surrounded by the negative electrode or the negative electrode collector that are newly formed every time the negative electrode or the negative electrode collector is folded.

(2) The battery according to (1), wherein in a width direction of the wound electrode body, the insulator is disposed between the positive electrode lead and the negative electrode lead.

(3) The battery according to (1) or (2), wherein the insulator is a polymer film with a pressure-sensitive adhesive.

(4) The battery according to any one of (1) to (3), wherein the insulator has a melting point of 130° C. or more, or is formed of a material not having a melting point.

(5) The battery according to (4), wherein the melting point of the insulator is 163° C. or more.

(6) The battery according to any one of (1) to (5), wherein the insulator is formed by applying a polymer material.

(7) The battery according to any one of (1) to (6), wherein the insulator is provided between an inner circumferential end face of the positive electrode, and the negative electrode collector that is opposed to the inner circumferential end face.

(8) The battery according to any one of (1) to (7), having a covering material for preventing a short circuit between the positive electrode collector and the negative electrode collector that are opposed to each other.

(9) A battery pack having:
  the battery according to (1),
  a control unit for controlling the battery, and
  an outer packing involving the battery.

(10) An electronic device that is supplied with electric power from the battery according to (1).

(11) An electromotive vehicle having:
  the battery according to (1),
  a convertor that converts electric power supplied from the battery into a driving force of
  the vehicle, and
  a controller that conducts information processing concerning vehicle control based on information about the battery.

(12) A power storage device having the battery according to (1), that supplies an electronic device connected with the battery with electric power.

(13) The power storage device according to (12), having an electric power information controller that transmits and receives a signal to/from other device via a network, the power storage device conducting charging and discharging control of the battery based on information received by the electric power information controller.

(14) An electric power system supplied with electric power from the battery according to (1).

(15) The electric power system according to (14), wherein electric power is supplied to the battery from a power generating device or an electric power network.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery comprising a wound electrode body including a positive electrode, a negative electrode, and a separator interposed therebetween,
   wherein,
   in an inner circumferential part of the wound electrode body, an insulator is configured to cover at least a partial surface of the separator or a negative electrode collector in a first space or a second space,
   the negative electrode collector includes a first portion, a second portion, a third portion, fourth portion, a fifth portion, and a sixth portion that are sequentially connected from a center of the wound electrode,
   the first portion is disposed in the center of the wound electrode body and has a plate-like shape having a first principle surface and a second principle surface opposite to the first principle surface,
   one end of the first portion in an extending direction of the first portion has no connection,
   the second portion is connected to the other end of the first portion and extends in a direction crossing the first principle surface,
   the third portion is connected to the second portion and has a plate-like shape disposed facing and apart from the first principle surface of the first portion,
   the fourth portion is connected to the third portion,
   the fourth portion is disposed at an opposite side of the second portion and extends in the direction crossing the first principle surface,
   the fifth portion is connected to the fourth portion and has a plate-like shape disposed facing and apart from the second principle surface of the first portion,
   the sixth portion is connected to the fifth portion and disposed overlapping an outer side of the second portion, and
   the positive electrode or a positive electrode collector is absent in the first space surrounded by the first portion, the second portion, and part of the third portion of the negative electrode collector or the negative electrode; and
   in the second space surrounded by the second principle surface of the first portion, part of the third portion, the fourth portion, the fifth portion, and part of the sixth portion, and
   the insulator is disposed at a surface of the third portion, the surface facing the first principle surface of the first portion, in the first space where the positive electrode or the positive electrode collector is absent.

2. The battery according to claim 1, wherein in a width direction of the wound electrode body, the insulator is disposed between a positive electrode lead and a negative electrode lead.

3. The battery according to claim 1, wherein the insulator includes a polymer film with a pressure-sensitive adhesive.

4. The battery according to claim 1, wherein the insulator has a melting point of 130° C. or more.

5. The battery according to claim 4, wherein the melting point of the insulator is 163° C. or more.

6. The battery according to claim 1, wherein the insulator includes a material not having a melting point.

7. The battery according to claim 1, wherein the insulator is formed by applying a polymer material.

8. The battery according to claim 1, wherein the insulator is disposed between an inner circumferential end face of the positive electrode, and the negative electrode collector opposed to the inner circumferential end face.

9. The battery according to claim 1, further comprising a covering material configured to prevent a short circuit between the positive electrode collector and the negative electrode collector.

10. A battery pack comprising:
    the battery according to claim 1,
    a controller configured to control the battery, and
    an outer packing configured to accommodate the battery.

11. An electronic device configured to be supplied with electric power from the battery according to claim 1.

12. An electromotive vehicle comprising:
    the battery according to claim 1,
    a convertor configured to convert electric power supplied from the battery into a driving force of the vehicle, and
    a controller configured to conduct information processing concerning vehicle control based on information about the battery.

13. A power storage device comprising the battery according to claim 1, wherein the power storage device is configured to supply electric power to an electronic device connected with the battery.

14. The power storage device according to claim 13, comprising an electric power information controller configured to transmit and receive a signal to/from a device via a network, wherein the power storage device is configured to conduct charging and discharging control of the battery based on information received by the electric power information controller.

15. An electric power system configured to be supplied with electric power from the battery according to claim 1.

16. The electric power system according to claim 15, wherein electric power is configured to be supplied to the battery from a power generating device or an electric power network.

* * * * *